United States Patent
Krupp et al.

(10) Patent No.: US 9,459,022 B2
(45) Date of Patent: Oct. 4, 2016

(54) MULTI-COMPONENT SYSTEM FOR TREATING ENCLOSED ENVIRONMENTS

(71) Applicant: Supplier Support International, Inc., Acworth, GA (US)

(72) Inventors: David L. Krupp, Acworth, GA (US); Kevin D. Krupp, Acworth, GA (US)

(73) Assignee: Supplier Support International, Inc., Acworth, GA (US)

( * ) Notice: Subject to any disclaimer, the term of this patent is extended or adjusted under 35 U.S.C. 154(b) by 126 days.

(21) Appl. No.: 14/490,515

(22) Filed: Sep. 18, 2014

(65) Prior Publication Data

US 2015/0128483 A1  May 14, 2015

Related U.S. Application Data

(60) Provisional application No. 61/879,598, filed on Sep. 18, 2013.

(51) Int. Cl.
| | |
|---|---|
| *A01M 1/20* | (2006.01) |
| *F24H 3/02* | (2006.01) |
| *F24D 5/02* | (2006.01) |
| *F24F 3/14* | (2006.01) |
| *F26B 23/02* | (2006.01) |
| *F26B 21/00* | (2006.01) |
| *F26B 21/02* | (2006.01) |
| *F24H 3/04* | (2006.01) |
| *F24H 9/18* | (2006.01) |
| *F24H 9/20* | (2006.01) |
| *F24D 5/04* | (2006.01) |

(52) U.S. Cl.
CPC ............ *F24H 3/025* (2013.01); *A01M 1/2094* (2013.01); *F24D 5/02* (2013.01); *F24D 5/04* (2013.01); *F24F 3/14* (2013.01); *F24H 3/0488* (2013.01); *F24H 9/1881* (2013.01); *F24H 9/2085* (2013.01); *F26B 21/001* (2013.01); *F26B 21/004* (2013.01); *F26B 21/02* (2013.01); *F26B 23/022* (2013.01)

(58) Field of Classification Search
CPC ..... A01M 1/2094; A01M 19/00; A01M 1/24
USPC ........................................................ 43/132.1
See application file for complete search history.

(56) References Cited

U.S. PATENT DOCUMENTS

| | | | | |
|---|---|---|---|---|
| 4,953,320 A * | 9/1990 | Nelson | ............... | A01M 1/02 43/121 |
| 5,203,108 A * | 4/1993 | Washburn, Jr. | ...... | A01M 17/008 43/124 |
| 6,279,261 B1 * | 8/2001 | Binker | ............... | A01M 17/008 422/32 |
| 6,327,812 B1 | 12/2001 | Hedman et al. | | |

(Continued)

*Primary Examiner* — Shin Kim
(74) *Attorney, Agent, or Firm* — MacMillan, Sobanski & Todd, LLC

(57) ABSTRACT

Described herein is a heating system where air is drawn into a system where hot gas is injected into it. The air is then discharged at a regulated temperature into an environment through ductwork to heat environments to elevated temperatures and employing functional modules to further condition the air to humidify, dehumidify, decontaminate with airborne free-radicals, and filtrate in both stationary and portable applications. The system is useful to eradicate pests, disease germs, bacteria, viruses, and mold. The system is also useful in water remediation and comfort heating. The system can be configured to create a parallel path to both heat and dehumidify the airflow blended and discharged at the operator-chosen set-point temperatures.

16 Claims, 24 Drawing Sheets

(56) References Cited

U.S. PATENT DOCUMENTS

| | | | |
|---|---|---|---|
| 6,588,140 B1 * | 7/2003 | Johnson | A01M 1/2094 43/124 |
| 7,360,534 B2 | 4/2008 | Krupp | |
| 7,690,148 B2 | 4/2010 | Hedman | |
| 7,712,249 B1 * | 5/2010 | Modlin | A01M 1/205 239/102.2 |
| 8,256,135 B2 * | 9/2012 | Hedman | A01M 1/2094 34/381 |
| 8,388,222 B2 * | 3/2013 | Potter | A01M 1/2094 374/102 |
| 8,479,439 B2 * | 7/2013 | DeMonte | A01M 1/2094 126/110 B |
| 8,479,440 B2 * | 7/2013 | DeMonte | A01M 1/2094 126/110 B |
| 8,720,109 B2 * | 5/2014 | O'Brien | A01M 1/2094 122/4 A |
| 8,726,539 B2 * | 5/2014 | Potter | F26B 9/02 165/54 |
| 9,226,489 B2 * | 1/2016 | Pattison | A01M 1/2094 |
| 9,226,491 B2 * | 1/2016 | Nichols | A01M 1/24 |
| 9,247,725 B2 * | 2/2016 | Hosli | A01M 1/20 |
| 2010/0224697 A1 * | 9/2010 | Modlin | A01M 29/12 239/102.1 |
| 2013/0276357 A1 * | 10/2013 | Shannon | A01M 13/00 43/132.1 |
| 2015/0128483 A1 * | 5/2015 | Krupp | F24H 3/025 43/132.1 |
| 2016/0073621 A1 * | 3/2016 | Nielson | A01M 1/00 43/132.1 |

* cited by examiner

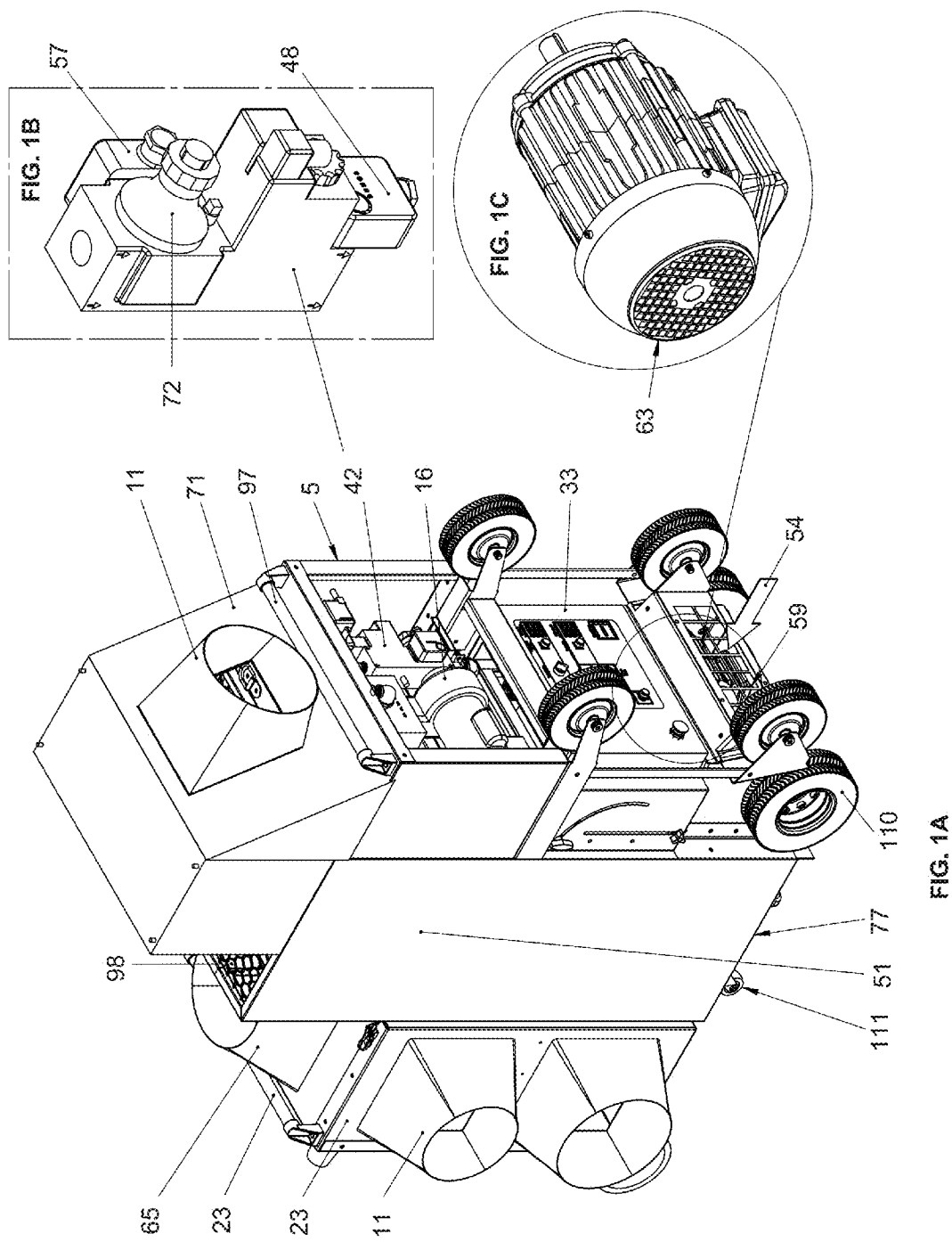

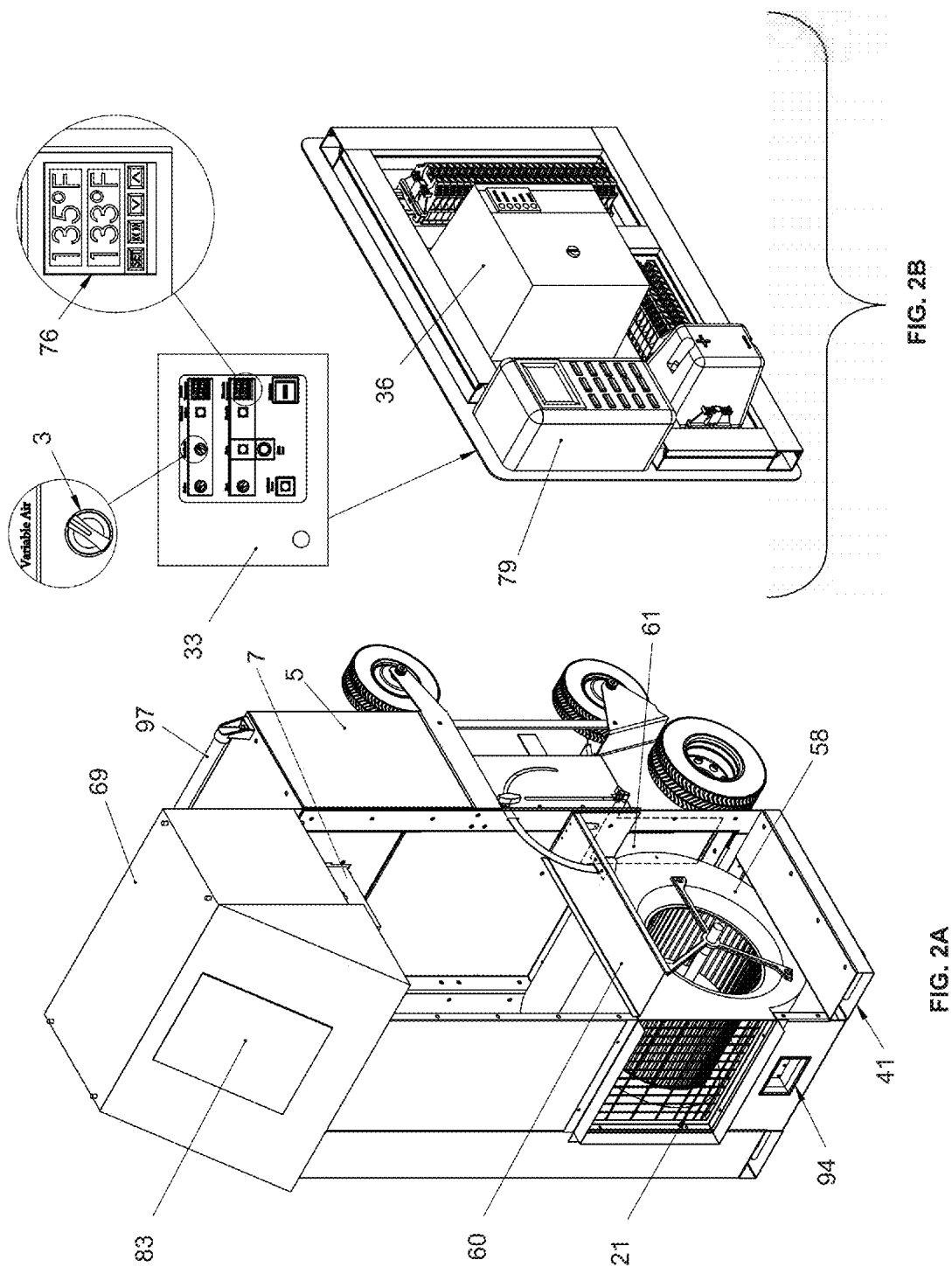

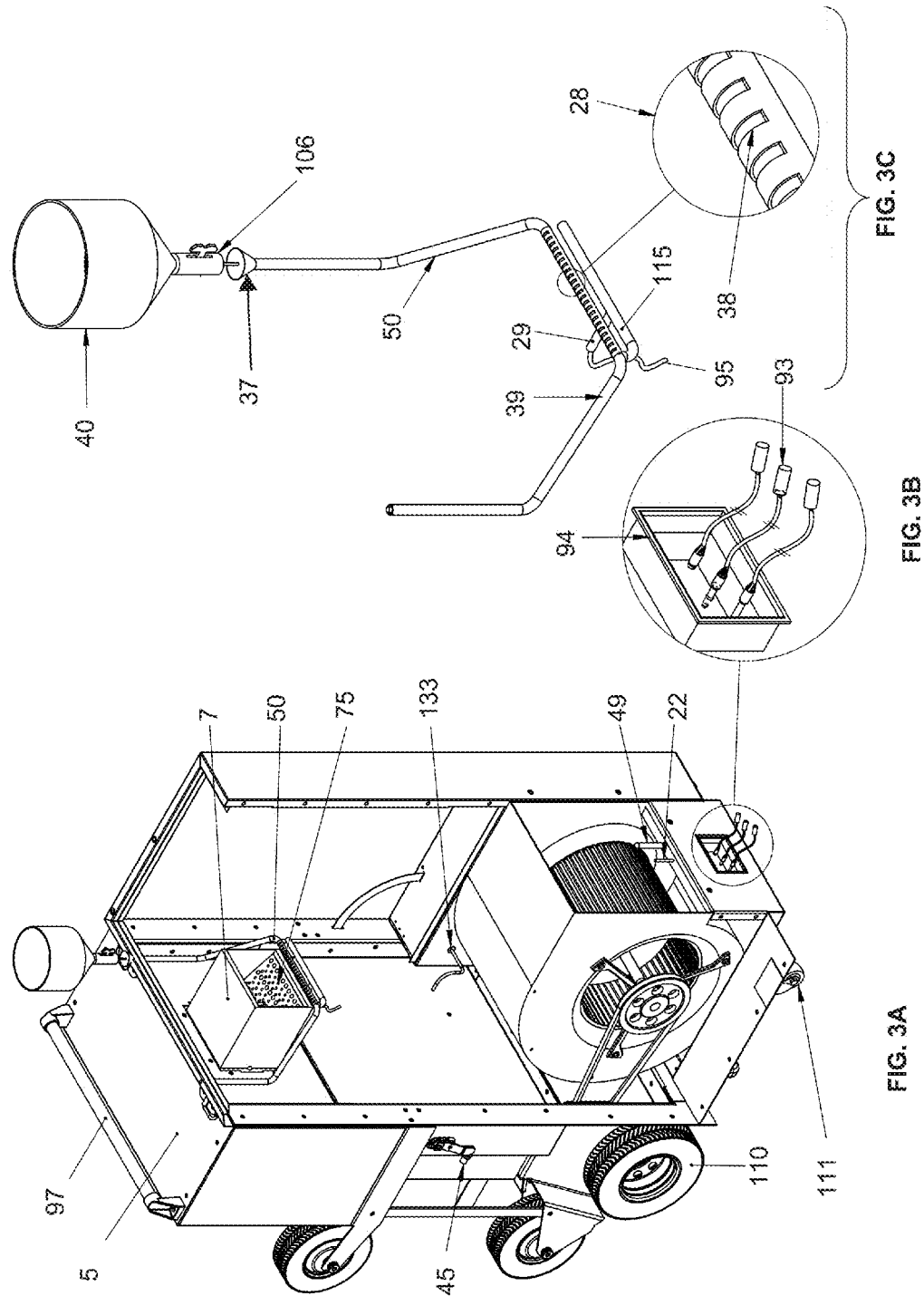

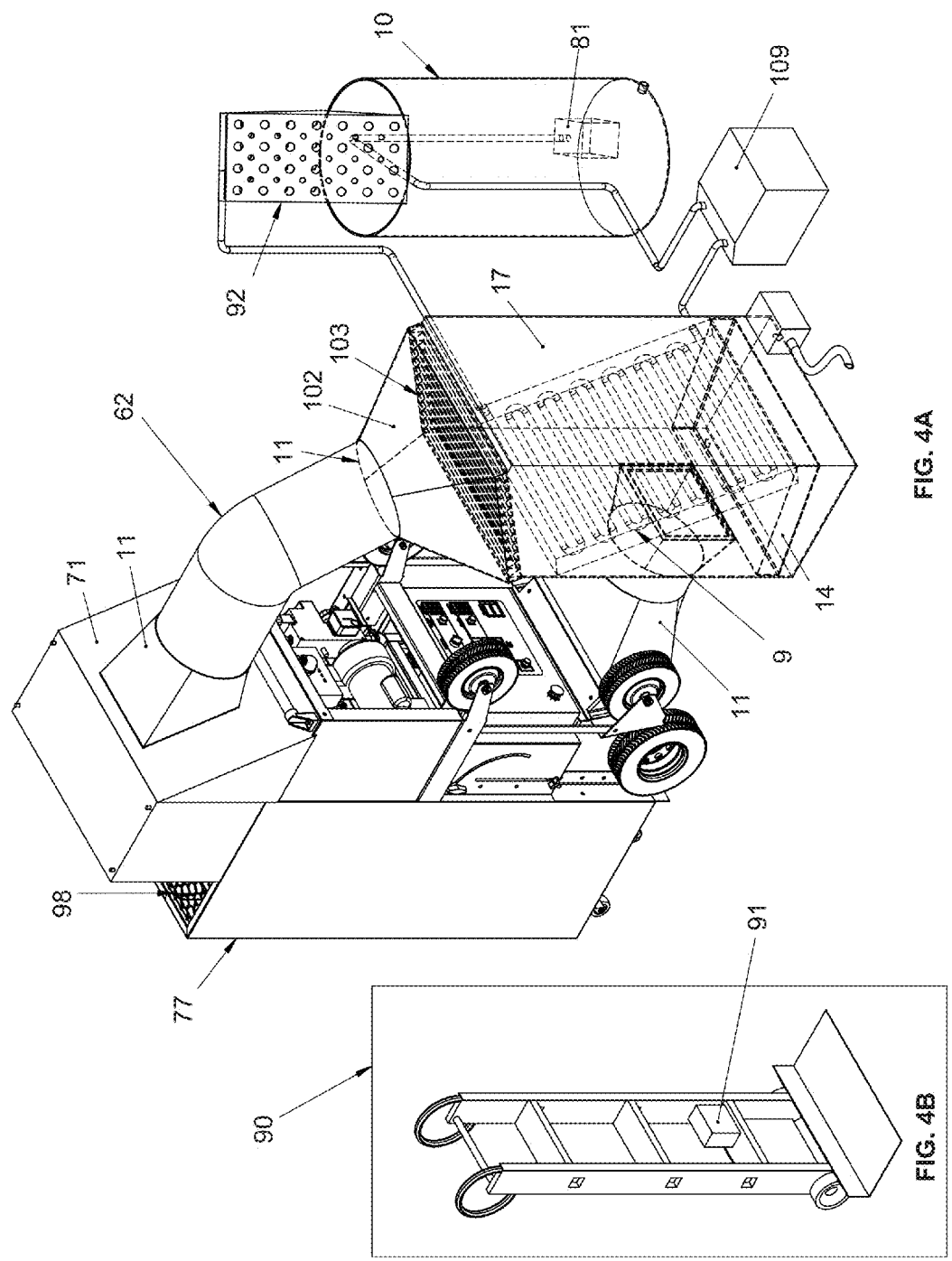

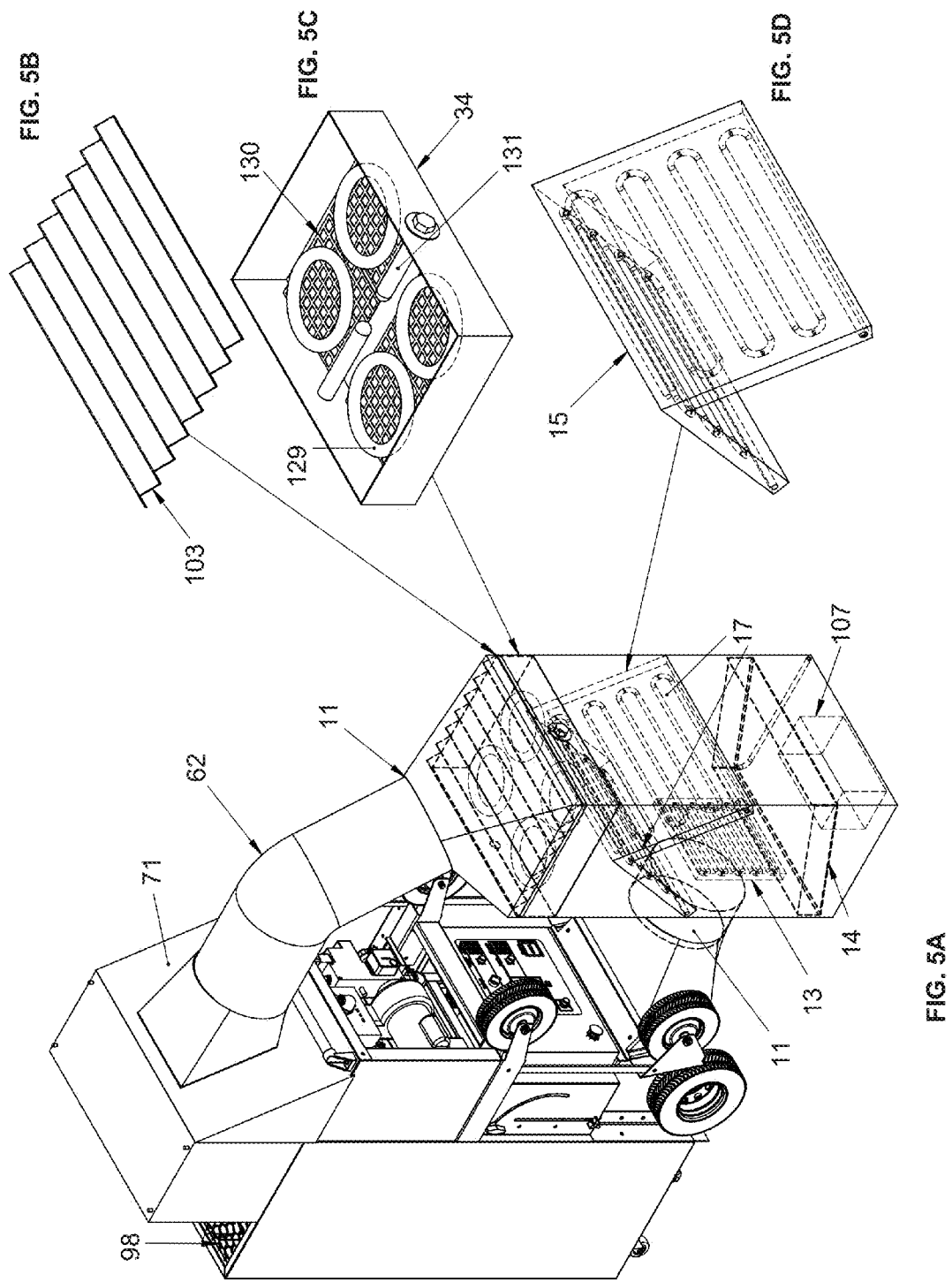

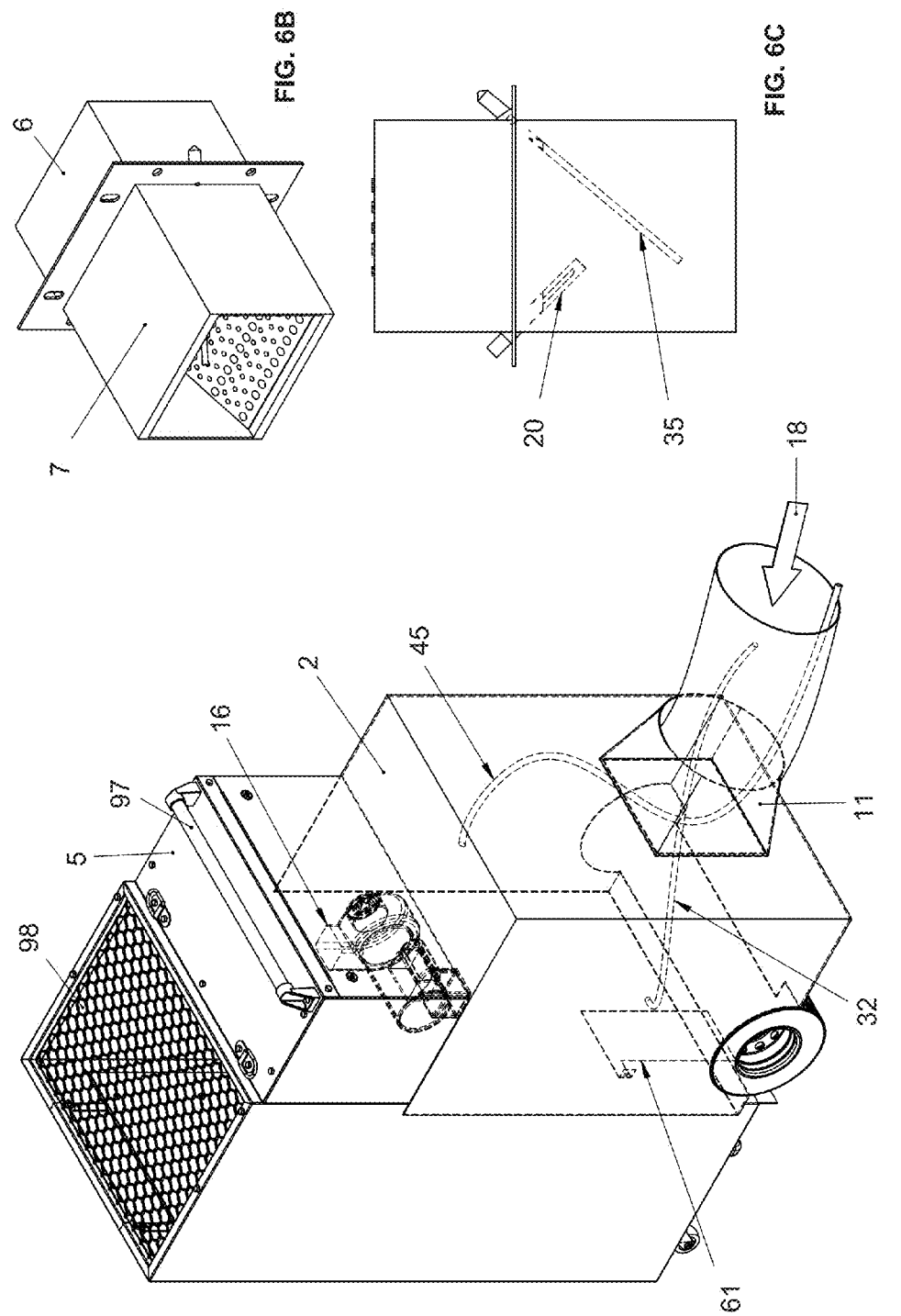

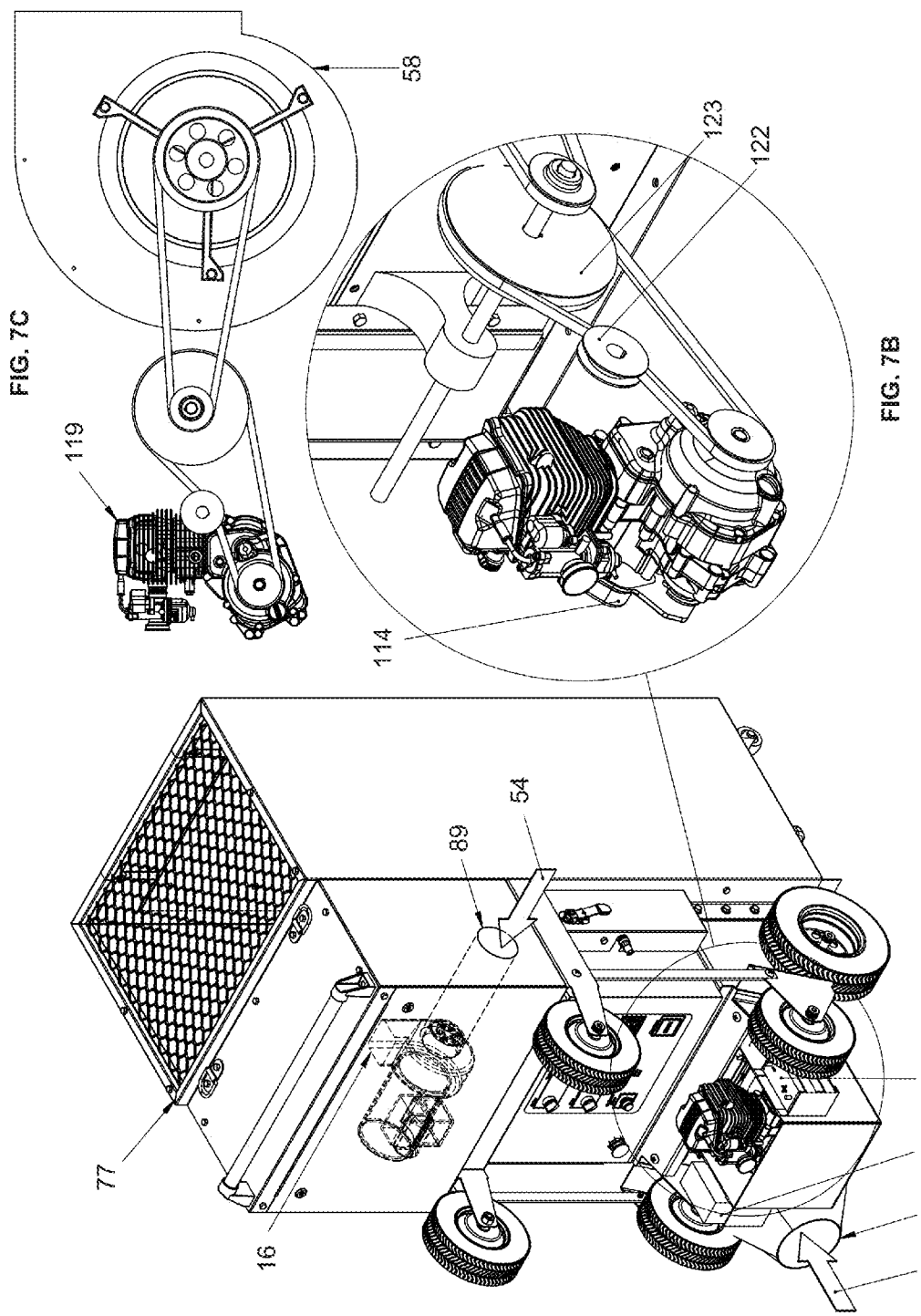

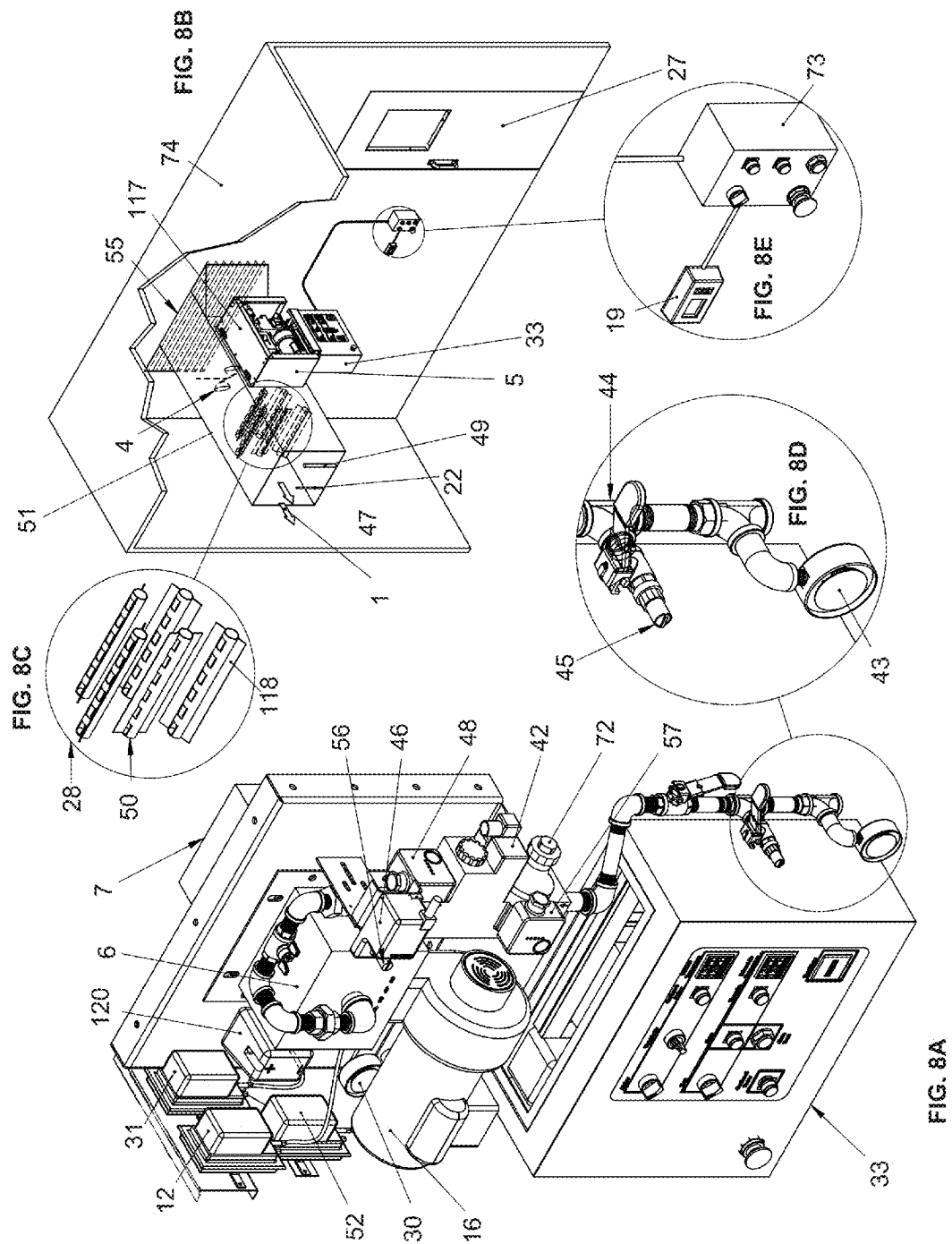

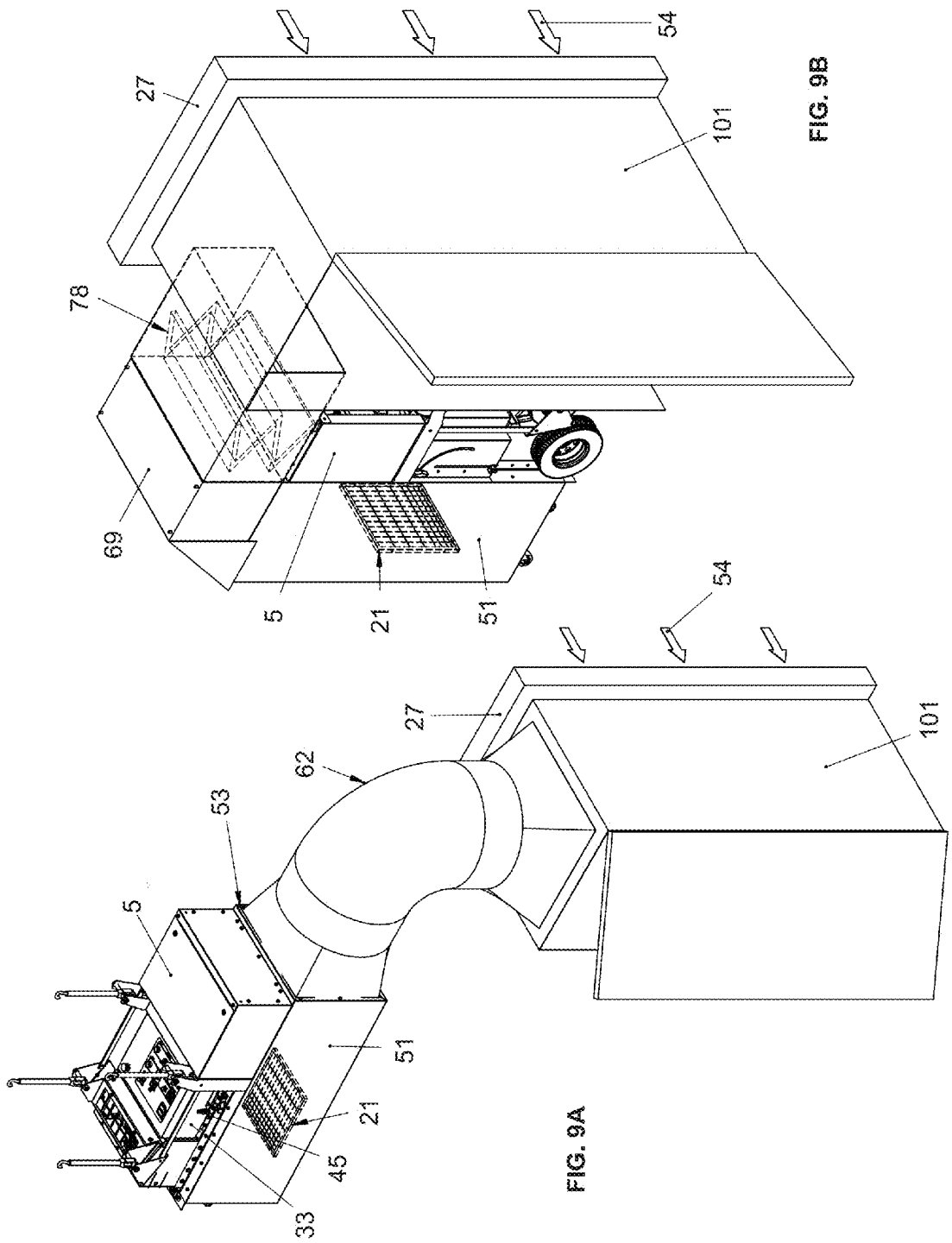

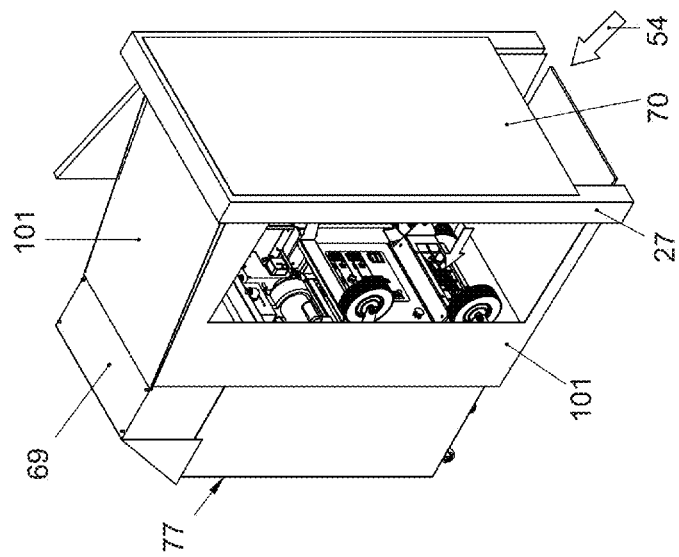
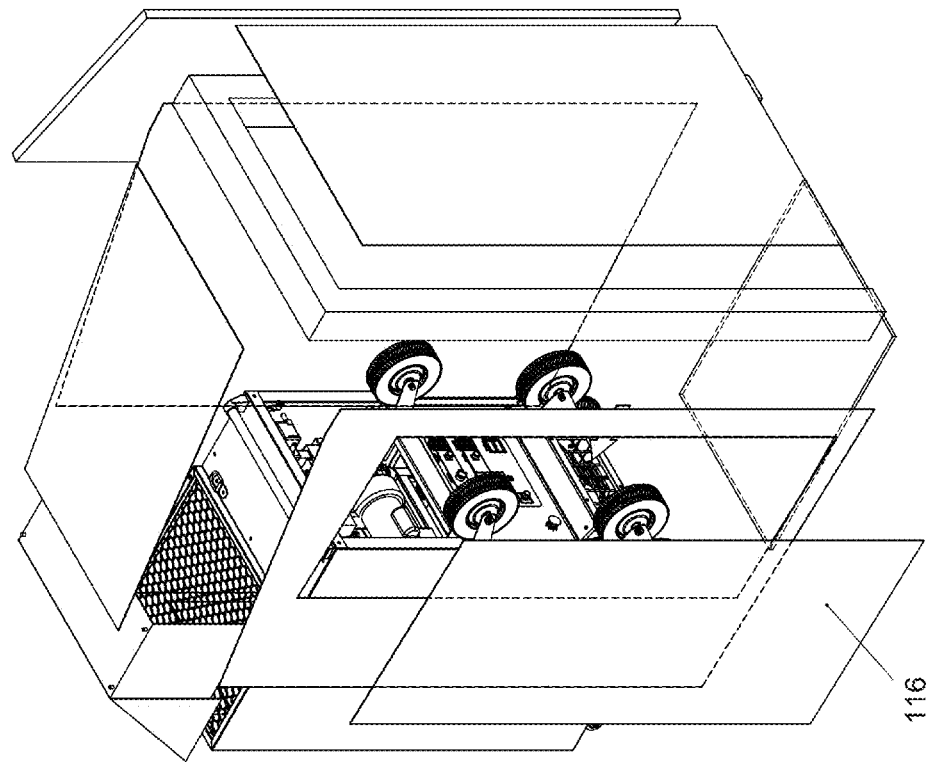
FIG. 10B
FIG. 10A

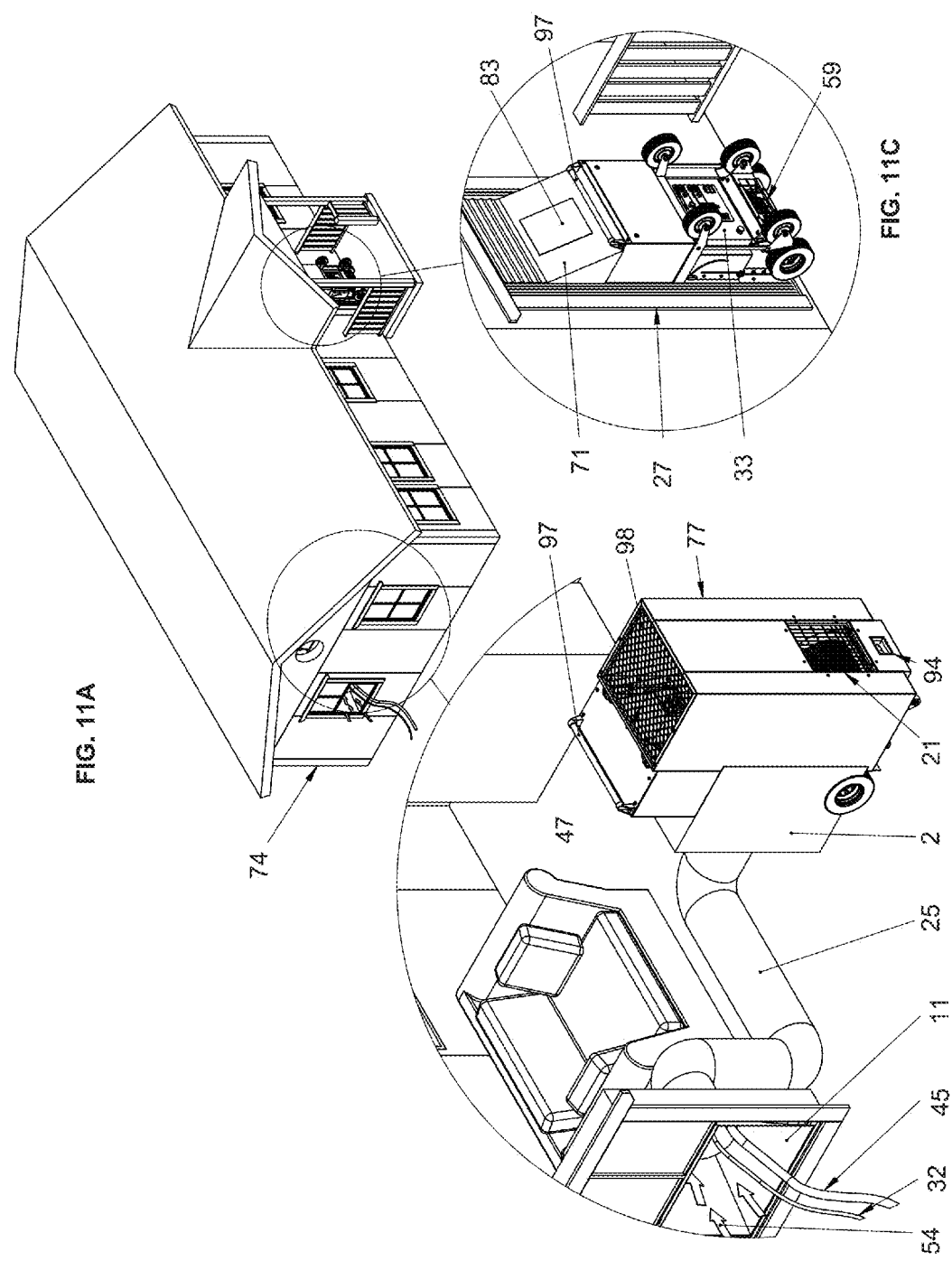

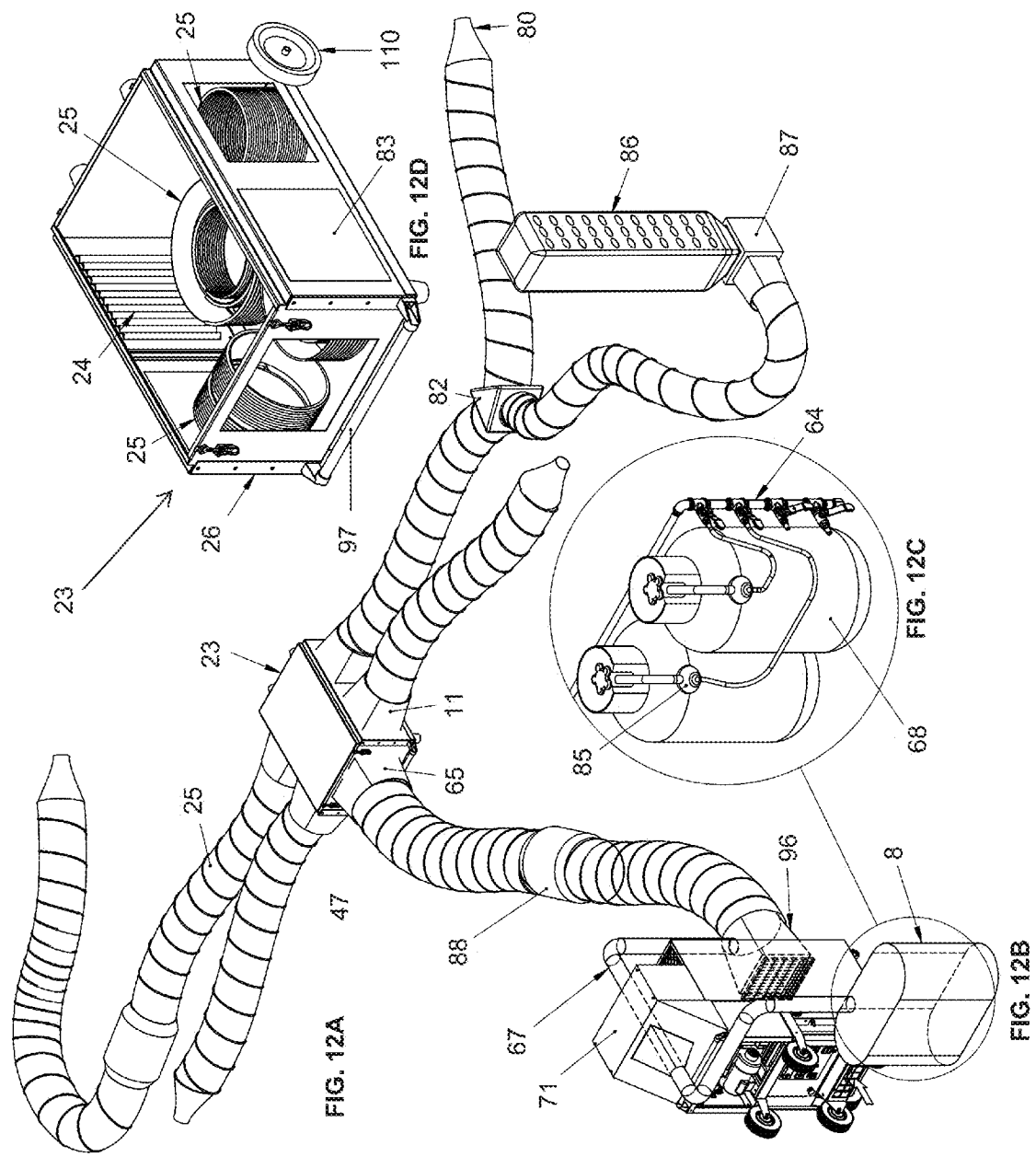

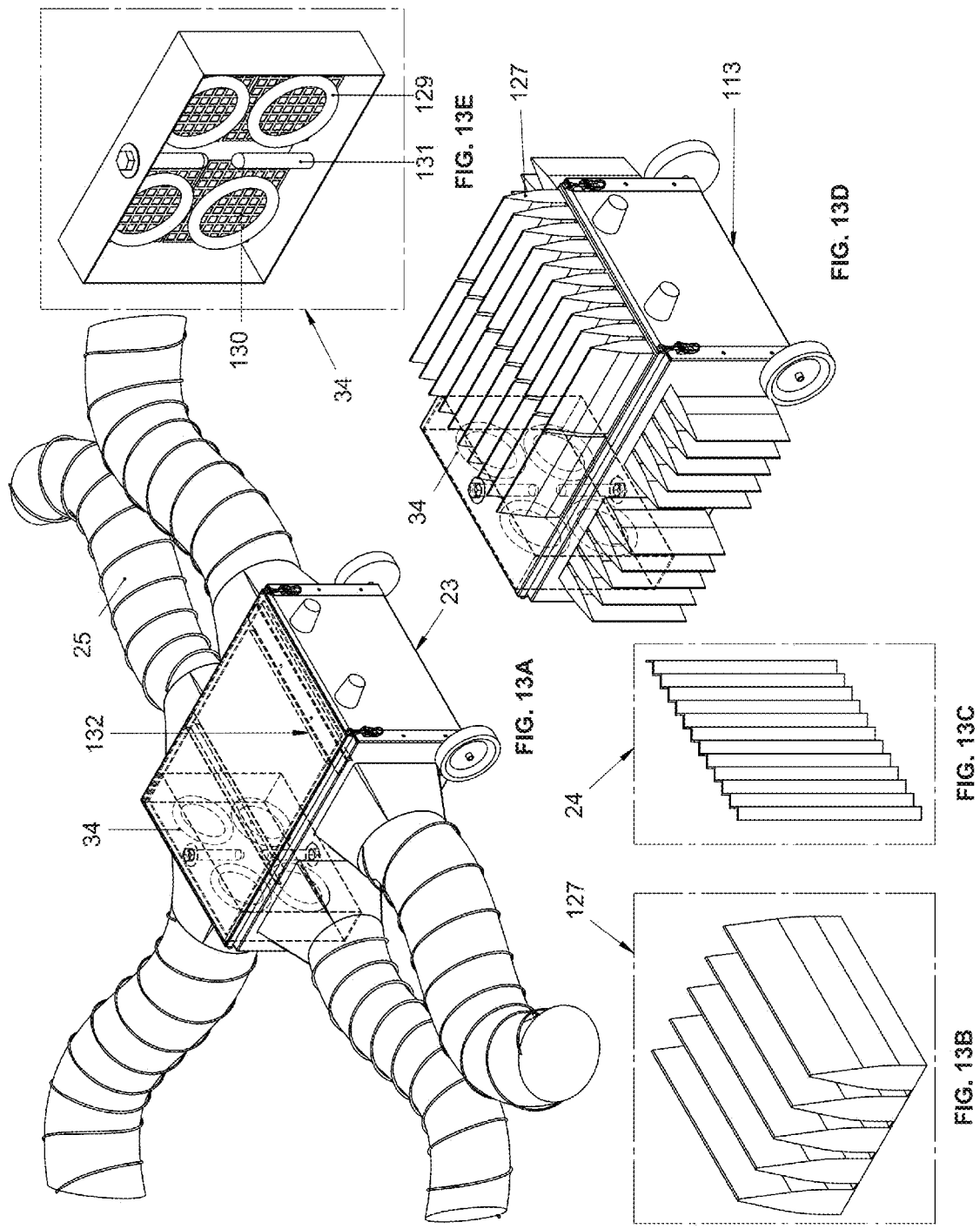

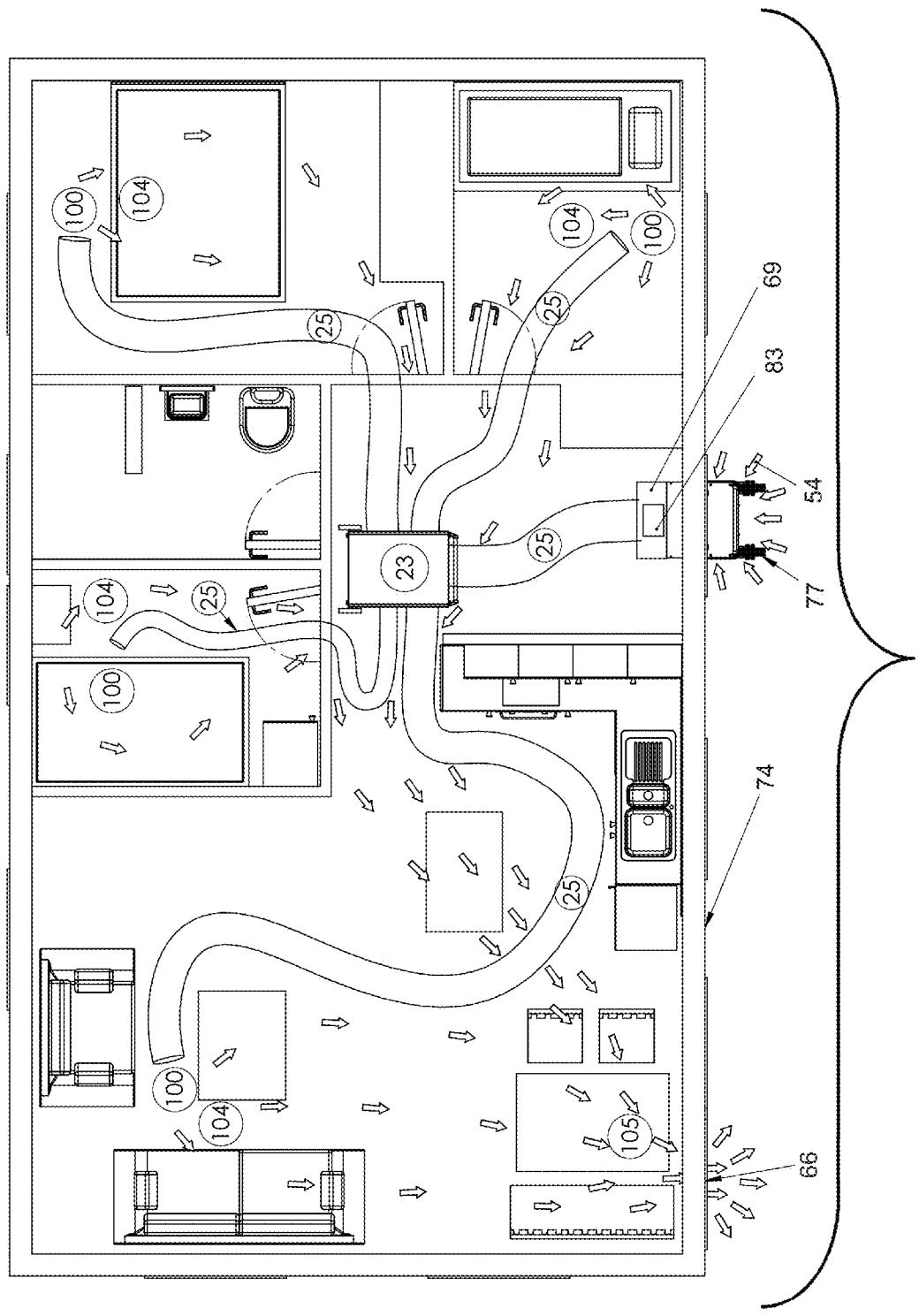

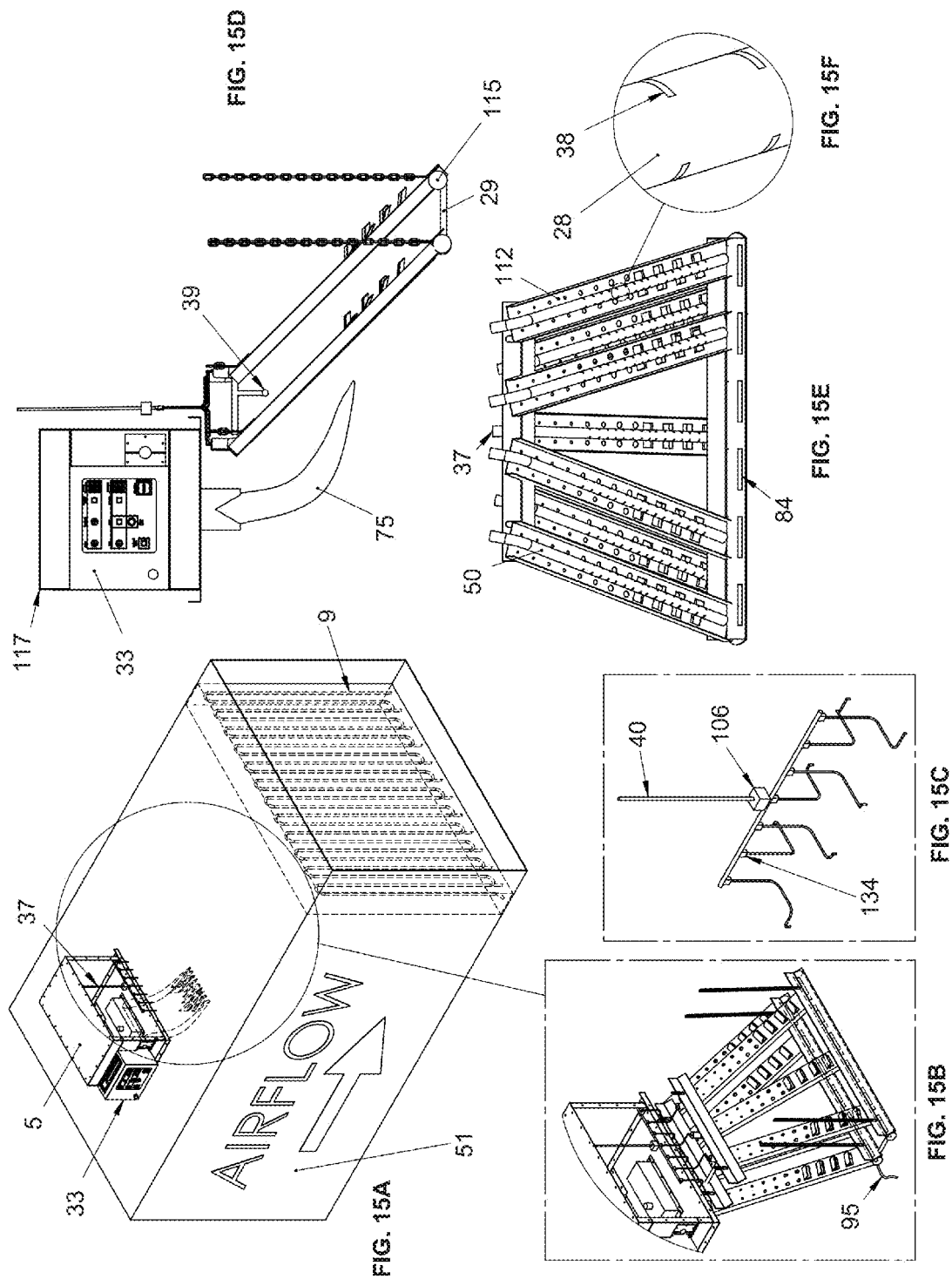

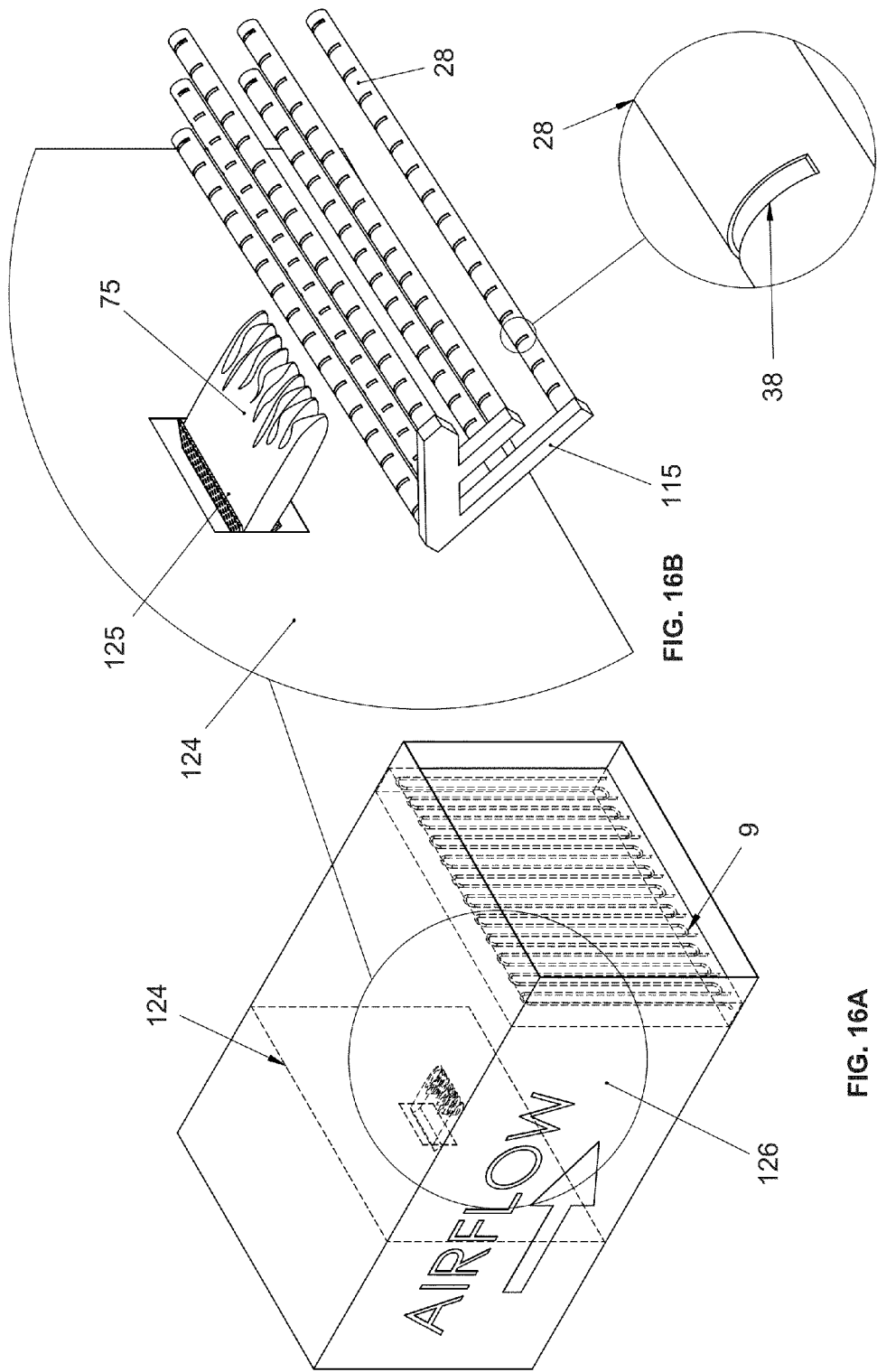

Method for Heat Treatment

- Position the machine & create a thermal seal
- Attach discharge duct
- Plug in the machine
- Test ducts for full airflow
- Attach gas canisters to manifold
- Attach supply hose to manifold
- Attach supply hose to machine
- Charge lines to machine
- Shut off to confirm pressure after time
- Open valve at machine
- Start airflow
- Start heat at specified temperature
- Monitor areas
- Balance flow rates
- Pressurize when return air is lethal
- Purge heat after treatment

FIG. 18

Method for Water Remediation

Position System in doorway with Air Intake Hood to draw air from structure, and form a thermal barrier Attach flexible duct to Discharge and position discharge locations within structure Plug Machine into standard 120v source. turn on airflow and test ducts at full airflow Attach regulated output of LP gas canisters to gas supply manifold and gas supply line to machine Open LP gas canisters to charge gas lines then shut off and test for leaks by confirming that pressure was held Open gas valves at the LP gas canister, the supply manifold, and the machine Turn on Airflow and set Air Volume, Turn on Heat and Adjust Discharge Temperature Recirculate the heated airflow within structure to achive desired relative humidity (RH) at intake Attach Remote Dehumidification Chamber to Modulated Air Inlet and position to draw warm moist air from Structure Once desired RH is reached, open Modulated Air Inlet Gate and adjust Damper to achieve optimal dehumidification Engage the Hydroxyl Generator within Dehumidification Chamber to inject hydroxyls into Blended Air Discharge Monitor internal temperatures and moisture content in air and structure, until it has reached an acceptable range

FIG. 20

MULTI-COMPONENT SYSTEM FOR TREATING ENCLOSED ENVIRONMENTS

RELATED APPLICATIONS

This application claims priority to the provisional patent application Ser. No. 61/879,598 filed Sep. 18, 2013, the entire content of which is incorporated herein in its entirety.

TECHNICAL FIELD

Described herein is a multi-component air heating system that can be used to provide heated replacement or recirculated air. In one aspect, the system is useful for humidifying or dehumidifying air; eradicating pests, disease germs, viruses, mold, or bacteria from an environment; and/or drying or sanitizing an environment by engaging different modules.

BACKGROUND

The resurgence of bed bugs continues at an alarming pace. The chemical options appear to have failed to impede their continual growth. While it is well known in the pest control community that elevated levels of heat is the most effective method to eradicate bed bug infestations, the equipment used to supply heat for the eradication process is not energy efficient, and is very bulky. Furthermore, some kinds of such equipment are unsafe, and many are inadequate to sufficiently heat a normal dwelling. Often, these methods are very inefficient because they continually have to heat the outside air, and are unsafe because they have uncontrolled discharge temperatures.

There is a need for new technology, further fostered with significant changes in the weather patterns that have caused significant flooding during colder temperatures. The current technology is unable to effectively and efficiently remediate many interior environments and/or structures. There are also problems during warmer outdoor temperatures, which cause the structure temperature to become above the operational temperature for the typical dehumidifier. Additionally, there is a poor utilization of the energy consumed in attempting to remediate such interior environments/structures.

Just as there are problems being experienced with regard to the equipment options available to eradicate bed bugs with heat, there are also problems being experienced in water remediation. When floods take place during colder temperatures, the typical methods to dry structures are ineffective with desiccant dryers because the evaporation rate is low, the typical zone dehumidifier does not function below 38-41° F. (15° C.), and most stop functioning when the ambient approaches about 100-104° F.

It would be advantageous to provide an alternative system that overcomes the above-mentioned concerns. It would be further beneficial to provide a system which has improved convenience of use, portability, efficiency, and safety in use. It would also be beneficial to add functional modules to such system in order to assist in conditioning the air by repositioning and or use only some modules of the total system to meet specific stationary, moveable, and portable applications.

BRIEF SUMMARY OF THE INVENTION

Provided herein is a system to supply an adjustable volume of discharge blended air into an enclosed environment. In such system, a source of BTU energy having a combustion blower is configured to establish an air-to-fuel ratio of heated gas for a burner. The system can include an injection chamber; an air inlet connected to the injection chamber configured to receive the heated gas from the source of BTU energy; a dual inlet having a blower configured to draw air through the injection chamber and to inject heated gas into the injection chamber; and a modulated air inlet gate and modulated air inlet damper positioned adjacent to the air inlet. The modulated air inlet damper is movable to a position to impede airflow to the dual inlet blower from the injection chamber. The modulated air inlet gate and modulated air inlet damper can be configured to provide a variable and divergent airflow through the air inlet (the divergent airflow being blended with the heated gas received in the injection chamber to form a discharge of blended air).

In certain embodiments, the system further comprises a dehumidification chamber positioned in communication with the modulated air inlet gate and damper. The dehumidification chamber can include a cooling mechanism configured to condense moisture from airflow before entering the modulated air inlet gate. In certain embodiments, the system further comprises a free radical ion generator within the dehumidification chamber. The free radical ion generator can be configured to inject hydroxyls into airflow through the modulated air inlet.

In certain embodiments, the system further comprises a humidification tube positioned within the injection chamber. The humidification tube can have one or more openings and being configured for receiving a fluid.

In certain embodiments, the system further comprises an air intake hood positioned on top of the injection chamber and capable of forming a barrier between an enclosed environment and an external environment. The air intake hood can be configured to draw air from the enclosed environment into the blower when in a closed position and from the external environment into the blower when in an open position.

In particular embodiments, the system further includes a distribution system operatively attached to the injection chamber. The distribution system can include a distribution box and ductwork configured to deliver a discharge of blended air to the enclosed environment, wherein the discharge of blended air transfers the BTU energy into the enclosed environment without the use of additional fans. In particular embodiments, the distribution system can include a humidification tube and a hydroxyl generator, where hydroxyls are generated from the moisture produced by the humidification tube. In particular embodiments, the system is portable and the air intake hood is configured to draw air from within the enclosed environment into both a dehumidification chamber and the air intake. The portable system can also act as a barrier itself, or can had additional barrier elements in order to separate the system from the heated environment, and/or to separate the heated environment from the external air being supplied to the combustion blower.

Provided herein is a method to heat an environment to elevated temperatures. The method can include the steps of positioning a system described herein to form a barrier between an enclosed environment and an external environment; and injecting sufficient BTU energy to discharge a variable airflow at a desired temperature, wherein the BTU energy is transferred into the environment, to heat the environment to an elevated temperature.

In certain embodiments, the method further comprises allowing a variable volume of air from outside the enclosed environment to increase the atmospheric pressure within the enclosed environment. In particular embodiments, the method comprises engaging a modulated air inlet damper within the system in order to transition a percentage of the air intake to be drawn through a modulated air inlet, wherein the airflow through the modulated air inlet pressurizes the environment. In particular embodiments, the air inlet gate is opened when the air intake temperature reaches the desired temperature. In particular embodiments, the air inlet gate is opened and the air inlet damper is engaged when the heated air flow becomes moisture laden.

In certain embodiments, airflow at a low relative humidity is recirculated through the environment to evaporate moisture within the environment, and the method further comprises opening the modulated air inlet gate and engaging the modulate air inlet damper to purge moisture laden air from the environment.

Provided herein is a method of dehumidifying an environment, the method comprising the steps of positioning a system described herein to form a barrier between an enclosed environment and an external environment; condensing moisture from the drawn air to dehumidify the environment; and injecting airborne free radicals into the discharged air.

Provided herein is a method to remediate smoke or water damage in a structure. The method generally includes the steps of positioning a system described herein to form a barrier between an enclosed environment in a structure and an external environment; positioning an air intake hood to draw air from the external environment; operating the system to purge air from the enclosed environment; repositioning the air intake hood to draw air from inside the enclosed environment; injecting heat into the enclosed environment (optionally, wherein the heat is distributed to remote locations within the environment through ductwork connected to the system); opening the modulated air inlet gate to draw air from the enclosed, heated environment; and injecting airborne hydroxyls into the enclosed environment to eradicate smoke or water damage in the structure.

In certain embodiments, the method further comprises engaging a dehumidification chamber so as to achieve a recirculated airflow through the environment at a lower relative humidity than the airflow drawn into the system.

Provided herein is a system to supply heated air to a process or environment, the system comprising an air intake connected to an injection chamber with a blower configured to draw air through the injection chamber; a source of BTU energy positioned outside the injection chamber and configured to inject sufficient super heated gas into the injection chamber to deliver an adjustable volume of heated air at a desired air temperature; and a mixing device located between the injection chamber and blower, the mixing device comprising one or more humidification tubes having a fluid source, a fluid inlet, a working section, and an accumulation tube, the humidification tubes configured to vaporize fluids released when the humidification tubes are heated to sufficient temperature with the super heated airflow. In certain embodiments, the system further comprises a distribution system of flexible ductwork configured to deliver heated air to remote locations in an environment. In certain embodiments, the system further comprises a remote control panel configured to allow operation of the system from a remote location.

There is provided herein a system to supply an adjustable volume of heated air that includes comprising a source of BTU energy in the form of a direct gas-fired burner positioned within the system but outside the injection chamber. The system has a dedicated combustion blower to establish the air-to-fuel ratio for the burner, and controls and mechanical systems necessary to produce flame with safety interlocks that continuously monitor the flame, gas pressure, gas regulation; and modulate the gas to achieve an operator chosen discharge temperature with an independent high temperature limit on the discharge.

In certain embodiments, the system includes a modulated air inlet gate; configured in the low pressure area on one side of the dual inlet blower section and the modulated air inlet damper; positioned between the injection chamber and the blower. In use, the gate is opened and the damper lowered to impede airflow through the injection chamber, on the side having the modulated air inlet gate, thereby causing a divergent volume of airflow through the modulated air inlet, blended with the airflow through the injection chamber; having been injected with sufficient heat to achieve the operator chosen discharge temperature.

In certain embodiments, the system includes an air intake hood disposed on top of the system and positioned on the entrance to an enclosed environment such that the intake hood forms an air barrier to enclose the environment. The motor and electrical controls for the system are thus outside the enclosed environment. The air intake hood is movable between a first position such that air from a first location is drawn by the dual air inlet blower into the injection chamber and is then discharged into the enclosed environment, and a second position wherein air from a second location is drawn by the dual air inlet blower into the injection chamber and is then discharged into same enclosed environment.

In certain embodiments, the system includes a connection on the intake hood which is configured to act as an air inlet connection for externally mounted devices. The air inlet hood can be positioned to draw air from within the enclosed environment through the connection, such that the air can be processed outside the enclosed environment. Such air is supplied essentially parallel to a heating process with supplies heated air such that the drawn air and heated air are blended together in the injection chamber to produce a blended airflow at the operator chosen discharge temperature.

In certain embodiments, the system includes a temperature sensor mounted on the air intake to sense the recirculated air temperature, wherein the temperature sensor acts as a thermostat to control the engagement of the burner and dedicated combustion blower based upon the air intake temperature.

In certain embodiments, the system is a portable system with the use of the door sleeve becomes a barrier to the heated enclosure; where the door sleeve is constructed of light weight, removable panels, containing an insulation factor, that might be rigid, or flexible with a frame, wherein the panels of the door sleeve are attached to the door frame and to the system and positioned so the door sleeve allows access to the environment through an access panel within the door sleeve.

In certain embodiments, positioned within the heated environment is a barrier for the heated environment formed by a fresh air inlet shell on the portable system, wherein fresh air for the combustion blower along with the volume into the modulated air inlet, flow through flexible duct from outside the heated environment to cause the flexible duct and the air inlet shell to form the barrier to the heated environment thereby allowing the motors and the controls to be cooled by the fresh air volume consumed by the portable system, away from the effect of the heated environment.

In certain embodiments, the system includes a plurality of wheels connected to at least one side and made to adapt to a mechanism wherein the mechanism has a force capable of moving the system up and down stairs wherein the attached mechanism with power of its own from an on-board battery, when directed by the operator, will lift or lower the system from step to step.

In certain embodiments, the system includes a remote control panel to allow operation of the moveable system from a remote location where the distance is a function of the electrical control wire to control the operation of airflow and heat with indication lights to reflect normal and alarm conditions wherein alarm conditions can be manually reset.

In certain embodiments, the system includes remote sensors, attached to data ports on the portable system, to log the most significant parameters to the process being performed, to include temperature, moisture related parameters, air contaminate levels to include, but not limited to ozone levels, VOC levels, carbon monoxide levels and other process related parameters, wherein the data from the remote sensors record the process, adjust the process and transmit via wireless communication the sensed data.

In certain embodiments, the system includes a remote dehumidification chamber positioned wherein the negative force created by the engagement of the modulated air inlet damper draws airflow through the filtered inlet of the remote dehumidification chamber, comprising a cooling coil or plate to condense the moisture in the airflow before entering the modulated air inlet.

In certain embodiments, the system includes sensors and electrical controls to sense, display and make adjustments to the airflow through the remote dehumidification chamber by adjusting the modulated air inlet damper to optimize the dehumidification process based upon the temperature and humidity of air entering and leaving the remote dehumidification chamber.

In certain embodiments, the system includes a remote dehumidification chamber, comprising a cooling coil or plate to condense moisture in the airflow, positioned outside the heated environment and attached to the modulated air inlet to draw, without the use of an additional fan or blower, a variable airflow from the heated environment through a port on the intake hood, into the remote dehumidification chamber through interconnected flexible duct, wherein the volume of airflow through the remote dehumidification chamber is varied by adjusting the position of the modulated air inlet damper.

In certain embodiments, the system includes sensors on the entrance and within the dehumidification chamber, electrical controls with programmed logic to vary the airflow through the remote dehumidification chamber to optimize the dehumidification process, by adjusting the modulated air inlet damper.

In certain embodiments, the system includes the cooling coil is a chilled water coil that circulates a chilled fluid from a refrigeration system.

In certain embodiments, the system includes a remote dehumidification chamber containing a DX cooling system positioned wherein the negative force created by the modulated air inlet moves an airflow through the cooling coil to condense the moisture and a through a heating coil to add heat into the dehumidified air entering the modulated air inlet, without the use of a separate fan and motor, In certain embodiments, the system includes the cooling coil receives chilled fluid from a reservoir cooled by the environment outside the heated environment, wherein a pump supplies chilled fluid from the chilled fluid reservoir and pushes it through the cooling coil and back to the reservoir where it is cooled by the environment and recirculated through the cooling coil.

In certain embodiments, the system includes air temperature sensors on the entrance and exit of the remote dehumidification chamber, fluid temperature sensors on the entrance and exit of the cooling coil, the electrical and mechanical systems required to adjust the modulated air inlet damper whereby the airflow through the modulated air inlet is adjusted to achieve optimal dehumidification given the sensed airflow and fluid temperatures.

In certain embodiments, the system includes a freeze prevention system to include audible and wireless alarms with freeze protection soft plugs.

In certain embodiments, the system includes a condensing pan to capture the water condensed from the moisture laden air.

In certain embodiments, the system includes a reservoir attached to the condensing pan where a pump is positioned, the pump comprising a level sensing switch to turn on the pump to drain the reservoir when the water level is significant.

In another aspect, there is provided herein a system to supply heated air to a process or environment comprising: an air intake connected to an injection chamber with a blower configured to draw air through the injection chamber and a source of BTU energy positioned outside the injection chamber and configured to inject sufficient super heated gas into the injection chamber to deliver an adjustable volume of heated air at the operator chosen blended air temperature, further including a mixing device located between the injection chamber and blower, with the mixing device consisting of humidification tubes; to vaporize fluids released when the humidification tubes are heated to sufficient temperature with the super heated airflow, comprising a fluid source, a fluid inlet, a working section, and an accumulation tube.

In certain embodiments, the humidification tubes are formed and positioned to conform to the size and position of the super heated airflow, having two ends, the first end comprising a fluid inlet and the second end an accumulation area where the non vaporized fluid might accumulate with a working section between the first and second ends; disposed so as to be heated with the superheated air, with openings within the tubes where steam or vapor can be released.

In certain embodiments, the humidification tubes set in a dissipation channels; a heat sink to transfer more heat into the humidification tube and to disperse the injected heat though out the duct.

In certain embodiments, dissipation channels might have openings or louvers to further disperse the injected heat.

In certain embodiments, working section of the humidification tube comprises multiple shapes and sizes to optimize the humidification process given the parameters of the heat source and airflow.

In certain embodiments, the system further includes an electrically operated fluid inlet valve engaged once the humidification tube reaches a predetermined release temperature through to allow fluid flow from the fluid through a gravity fed connection, having no direct connection to the fluid source thereby preventing backpressure on the fluid source from the creation of steam.

In certain embodiments, fluid flow is modulated based upon the sensed temperature of the humidification tube, a paced rate for medicine or scents or based upon the moisture content in the discharged air.

In certain embodiments, the modulation of fluid flow receives input from the gas modulation to adjust fluid flow in anticipation of sensed temperatures.

In certain embodiments, the super heat airflow come from a source of BTU energy positioned within the combustion chamber further comprising a fluid level sensor on the accumulation tube or area; interlocked to the fluid release valve to prevent fluid flow when fluid is sensed.

In certain embodiments, the accumulation tube or area is ducted to a drain; preventing excess fluid flow from overflowing the working section.

In certain embodiments, the system is a portable heating apparatus to produce energy efficient portable heat during times of power outages that includes: the application of the gas engine and drive shaft power module to drive the main airflow blower and to transition the speed of the engine to produce full power on the blower; positioned as a barrier to the heated environment with the air inlet hood to draw air from within the environment, utilizing the distribution system, to recirculate air within the environment; eliminating the inefficiency of generating electricity and subsequently converting electricity to mechanical force to drive the main airflow blower and with the use of an inverter to operate the controls wherein the power of the gas engine is greater than the power available from the land based power; increasing the air volume with less energy due to the low static load of this patented heating apparatus and wherein the volume of heated air does not affect the products of combustion of the BTU energy injected.

In certain embodiments, the system includes a distribution box to receive the discharge of the system with multiple ductwork connected to discharge ports of the distribution box wherein the air within the environment is circulated as the discharge, through ductwork to remote locations within the environment, moves air within the environment to the air intake of the system.

In certain embodiments, the distribution box is attached to the moveable system with flexible ductwork and fabric cinches and the flexible ductwork on the discharge ports are connected with fabric cinches wherein extensions to the flexible duct is added with duct to duct fabric cinches.

In certain embodiments, the distribution box is attached directly to the discharge of the moveable system by removing the main access panel.

In certain embodiments, the distribution box is configured to store and transport flexible ductwork, fabric cinch connectors and the air intake hood when not in use.

In certain embodiments, the distribution box comprises wheels configured to provide portability.

In certain embodiments, the system further includes a filter installed within the distribution box such that the air being discharged is filtered.

In certain embodiments, the system further includes a free radical hydroxyl generator within the distribution box such that air being discharged is blended with hydroxyls.

In certain embodiments, the system includes an external hydroxyl generator placed parallel to the heated airflow wherein airflow through the modulated air inlet draws hydroxyls into the main airflow, without the use of any external fans, to be blended with the discharged air.

In certain embodiments, the system includes a hydroxyl generator placed within the dehumidification chamber, parallel to the heated airflow, wherein airflow through the modulated air inlet draws both dehumidified air and hydroxyls, without the use of an external fan, in to be blended with the discharged air wherein heat, dehumidified air and hydroxyls are blended.

In certain embodiments, the system containing humidification tubes further includes a hydroxyl generator positioned parallel to the heated airflow wherein airflow through the modulated air inlet draws hydroxyls in to be blended with the discharged air wherein heat, humidity and hydroxyls are blended.

In another aspect, there is provided herein a method to heat an environment to elevated temperature levels (wherein motors and electrical controls are outside the heated environment, no discharge duct is outside the environment being heated and additional fans are not required to move the air within the environment) comprising: a system wherein the air intake hood is positioned to draw air from within the environment, inject sufficient Btu energy to discharge a variable airflow at an operator chosen temperature, wherein the Btu energy is transferred into remote locations within the environment, through flexible and temporary ductwork attached to the portable system, where the Btu energy is absorbed by the environment and its contents as the airflow travels within the environment from the point of discharge toward the air intake of the portable system, wherein the infusion of Btu energy continues until the intake temperature approaches the discharge temperature.

In certain embodiments, the method includes opening the modulated air inlet gate to allow a variable volume of air from outside the environment being heated, to increase the atmospheric pressure within the environment, further increased by the engagement of the modulated air inlet damper to transition a percentage of the air intake to be drawn through the modulated air inlet, wherein the airflow through the modulated air inlet will pressurize the environment, forcing heated air within the environment to flow through openings within the environment to ensure thorough heating of the environment.

In a further aspect, there in provided herein a method to eradicate pests with heat and pressurized airflow with motors and electrical controls outside the heated environment comprising: system wherein the air intake hood is positioned to draw air from within the environment, inject Btu energy to bring the airflow to user defined discharge temperature and transfer the Btu energy into remote locations within the environment through flexible and temporary ductwork attached to the portable system, where the Btu energy is absorbed by the environment and its contents as the airflow travels within the environment to the air intake of the portable system where it again given an infusion of Btu energy to be transferred into the environment until the air intake temperature reaches the desired eradication temperature at which time the modulation air inlet gate is opened to draw air from outside the environment to pressurize the environment causing the lethal temperatures to forced though openings in the environment to thoroughly eradicate the pests.

In certain embodiments, the method includes the repositioning of the air intake hood to pull air from outside the environment instead of from within the environment, thereby forcing the heat within the environment to be discharged from the environment through open doors and windows.

In another aspect, there is provided herein a method to dry an environment comprising: positioning a system wherein the air intake hood is positioned to draw air from within the environment, inject heat and discharge the heated air through flexible duct to remote locations within the environment, wherein the recirculated airflow absorbs moisture from the environment until the heated air becomes moisture laden; as determined by the relative humidity, at which time the modulated air inlet gate is opened and the modulated air inlet damper is engaged to purge moisture laden air from the environment through an opening within the environment.

In another aspect, there is provided herein a method to treat for smoke and water damage in an environment, comprising: a system with the air intake hood positioned to draw air from outside the environment; and operating the system to purge smoke laden air from the environment, through openings in the environment, with or without the addition of heat, until a thorough purge of the environment is complete, and repositioning the air intake hood to draw air from inside the environment, wherein heat is injected and distributed to remote locations within the environment, through flexible duct coupled with fabric cinches and duct junction boxes, wherein airflow at a low relative humidity is recirculated through the environment to evaporate the moisture within the environment until optimal for evaporation is achieved, then opening the modulated air inlet gate and engaging the modulated air inlet damper to purge moisture laden air from the environment through an opening within the environment.

In a method to dry an environment, the method can include use of a system with remotely attached dehumidification chamber, positioned within the environment requiring water remediation, wherein the portable system supplies the force to draw variable airflow, from the environment requiring water remediation, through either the injection chamber, wherein heat is added, or the remote dehumidification chamber attached to the modulated air inlet, wherein the moisture is condensed, causing the discharged air to be at a lower relative humidity than the airflow entering from the environment, thereby enhancing the water remediation of the environment.

In a method to dry an environment, the method can include wherein heat is added to the airflow entering the injection chamber from the environment being treated, to reduce the relative humidity and increase the evaporation rate when discharged within the environment, with the employment of the dehumidification chamber, a variable volume of air is also drawn from the environment through the port on the air intake hood, to pass through the remote dehumidification chamber, wherein the volume of air is determined by the positioning of the modulated air inlet damper to optimally dehumidify the airflow, with the combined airflow discharged at lower relative humidity than the air being drawn from the environment.

In another aspect, there is provided herein a method to dehumidify an environment while injecting hydroxyls into the environment, comprising: positioning a system as described herein in an environment; optionally, attaching an external hydroxyl generator to the system, configured to injector airborne free radicals into the discharged air; and operating the system to dehumidify the environment with or without injecting hydroxyls into the environment.

In another aspect, there is provided herein a method to treat for smoke and water damage in an environment, comprising: a system with the air intake hood positioned to draw air from outside the environment; and operating the system to purge smoke laden air from the environment, through openings in the environment, with or without the addition of heat, until a thorough purge of the environment is complete, and repositioning the air intake hood to draw air from inside the environment, wherein heat is injected and distributed to remote locations within the environment, through flexible duct coupled with fabric cinches and duct junction boxes, wherein airflow at a low relative humidity is recirculated through the environment to evaporate the moisture within the environment until optimal for evaporation is achieved, then opening the modulated air inlet gate and engaging the attached remote dehumidification chamber to draw air from the heated environment through a port on the air inlet hood, through the dehumidification chamber and into the modulated air inlet, wherein the volume of air being dehumidified can be varied to achieve optimal dehumidification given the air temperature, the dew point and the cooling coil capacity to achieve a recirculated airflow through the environment at lower relative humidity than the airflow drawn into the portable system.

In certain embodiments, the method includes the injection of airborne free radicals in the airflow passing through the dehumidification chamber.

In a method to dry an environment with heat and environmental cooling, the method can include wherein the recirculated airflow with injected heat increases the evaporation rate and increased the dew point to allow the cooling coil, chilled by the outside environment, to dehumidify the environment.

In another aspect, there is provided herein a method to sanitize an environment and/or its contents, comprising: a system wherein an airflow is drawn from the environment into both the injection chamber, to inject heat, and into a remotely attached hydroxyl generator, connected to a port on the air intake hood, in a path parallel to the injection chamber, wherein airborne free radical hydroxyls are injected into the airflow drawn into the modulated air inlet and blended with the heated air to discharge a heated and sanitized airflow, at a user defined temperature, to be recirculated within the environment.

In a method to heat an environment with direct gas-fired portable heat, the method can include positioning a system in an environment such that the discharged air flows through multiple airflow paths, each within the environment; and operating the system to recirculate air within the environment.

In another aspect, there is provided herein a method to heat a large room with portable heat comprising: positioning a system in an environment such that the air intake draws in air from within the environment; and operating the system to recirculate air within the large room.

In another aspect, there is provided herein a method to add humidity, medicines, or scents to heated air, comprising: a system for injecting super heated gas into an airflow; and exposing the heated airflow to a humidification tube comprising openings and a fluid that vaporizes upon the humidification tube being exposed to the heated airflow, thereby adding moisture to the airflow to add humidity, medicines, or scents to heated air.

In another aspect, there is provided herein a method to eradicate mold, viruses, bacteria, or disease germs, comprising: positioning a system with the humidification tube being heated sufficiently with the BTU Energy being injected to achieve the desired discharge temperature, wherein the fluids being injected into the humidification tube are vaporized and blended with the heated air discharge into the environment.

In another aspect, there is provided herein a method to eradicate mold, viruses, bacteria, or disease germs, comprising: positioning a system; wherein the system contains the humidification tube within the injection chamber, positioned so as to be heated sufficiently with the heat being injected into the airflow passing through the injection chamber, with the humidification tube being heated sufficiently to vaporize liquids being injected into the humidification tube, wherein the vapors are blended with the heated air and discharge into the environment; and with the use of the modulated air inlet, airborne free radical hydroxyls are drawn in from a remote hydroxyl generator, parallel to the heated airflow, thereby causing the discharge to become a blend of heat, hydroxyls and vapors used to eradicate mold, viruses, bacteria, or disease germs.

In another aspect, there is provided herein a method to supply portable heat to an environment comprising: positioning a system; and attaching the air intake to the stationary cold air return within the environment, and discharging the air within the environment, wherein the heated air is moved throughout the environment from the high pressure area at the discharge to the low pressure of the cold air returns within the environment wherein the portable system draws air, injects heat and discharges it within the environment.

In another aspect, there is provided herein a method to heat an environment to elevated temperatures comprising: positioning a portable system; wherein the portable system injects heat into the airflow passing through the injection chamber and discharges it to remote locations within the environment, through flexible duct and duct junctions connected with fabric cinches, to prevent the motor and controls from being subjected to the heat within the environment.

In certain embodiments, the portable system injects heat into the airflow passing through the injection chamber and discharges it to remote locations within the environment, through flexible duct and duct junctions connected with fabric cinches, to prevent the motor and controls from being subjected to the heat within the environment.

In certain embodiments, the method includes positioning the heating apparatus such that the air intake draws outside air into the injection chamber where Btu Energy is injected, and; the discharge is attached to an entrance to the environment.

In another aspect, there is provided herein a method to create a portable heated airflow of outside air to an environment comprising: positioning the portable heating system and positioning the air intake hood such that the air intake draws outside air into the injection chamber where Btu Energy is injected, and; the discharge is attached to an entrance to the environment; and, engaging the modulated air inlet to pull a variable volume of air through the remote mounted hydroxyl generator wherein hydroxyls are injected, and discharging heated air into the environment with hydroxyls at the operator chosen discharge temperature.

In certain embodiments, the method to create a portable heated airflow of outside air to an environment wherein hydroxyls are injected comprising: positioning the portable apparatus of claim 3 such that the air intake pulls outside air into the injection chamber where Btu Energy is injected; and, the engagement of the airflow through the modulated air inlet to pull a variable volume of air through the remote mounted hydroxyl generator wherein hydroxyls are injected, with the discharge attached to the environment wherein the blended airflow is discharged into the environment through flexible duct attached to the discharge of the portable system, at the operator chosen discharge temperature.

In another aspect, there is provided herein a method to add scents and medicines to an environment to eradicate mold, viruses, bacteria, or disease germs, comprising: positioning a system wherein the system with the use of the air intake hood create a barrier to the heated environment, operating the system heat the environment produces the necessary heat to vaporize scents, or medicines when liquids are processed through the humidification tube and blended into the discharged air.

In another aspect, there is provided herein a method to decontaminate an environment and the air within an environment with heat, mechanical filtration, chemical reactions and medicine comprising: positioning a system, wherein the system with the use of the air intake hood create a barrier to the heated environment and positioned to draw air from within the environment, operating the system to heat the environment to elevated temperature where the air is discharged into a filter box located within the environment, releasing moisture in the form of water vapor and fluid based medicine with the application of the humidification tube, positioned within the superheated airflow being injected, to enhance the production airborne free radicals; negative ions used to chemically react to molds, germs, bacteria, virus and destroys volatile organic compounds, produced on the inlet to the filter box with the hydroxyl generator positioned before high efficiency particulate filters on the outlet to create a recirculated and decontaminated airflow within the environment.

In method to heat an environment with recirculated airflow, the method can include wherein the maximum unducted speed is automatically adjusted to a boosted speed; when a pressure switch that senses the discharge pressure closes to shunt the maximum speed adjustment resistor; boosting the maximum wiper voltage, causing the speed to be increased until the static load is removed wherein the boosted speed is set as a parameter on the VFD or established by putting in a second variable resistor in series with the speed adjustment resistor to establish the boosted speed.

In certain embodiments, the method establishes the power of a single main airflow blower heats, dehumidifies, injects airborne free-radical hydroxyls with the injection of fluids that vaporize to control humidity, add medicine or scents to condition the air.

In another aspect, there is provided herein a method to produce heated and dehumidified air within an environment without the use of land based power in the event of catastrophic events where power outages occur during cold seasons utilizing the portable system wherein the application of a gas engine drives a shaft in place of the electric motor to power the main airflow blower to operate at full power with the employment of the remote dehumidification chamber and environmentally chilled water supply.

In certain embodiments, the method produces a variable, regulated and energy efficient heated airflow without power from a stationary source or a portable generator eliminating the inefficiency in generating the electricity and the inefficiency of the motor that converts the electrical power to the mechanical force to operate the blower and utilizing the remote dehumidification chamber with an environmentally chilled cooling coil from a reservoir with fluid pump drawing chilled fluid from the bottom of the chilled water reservoir.

BRIEF DESCRIPTION OF THE DRAWINGS

FIG. 1A is a schematic perspective view of a multi-component system for treating an enclosed environment, in a configuration for re-cycling air in the environment.

FIG. 1B is a schematic perspective view of a main gas control valve having a high gas pressure switch and a low gas pressure switch shown in FIG. 1A.

FIG. 1C is a schematic perspective view of a blower motor shown in FIG. 1A.

FIG. 2A is a schematic perspective view of a multi-component system for treating an enclosed environment, in a configuration for purging air in the environment, with a side panel removed to show a modulation air inlet damper and gate, and a main airflow blower with an air intake positioned to draw fresh air into an injection chamber.

FIG. 2B is a schematic perspective view a control panel containing a flame safeguard system, variable frequency drive (VFD), and a temperature controller.

FIG. 3A is a schematic perspective view of a multi-component system for treating an enclosed environment, in a configuration for humidifying air in the environment, with front and side panels removed to show a humidification tube system having a fluid supply, a fluid inlet, a humidification tube, a temperature sensor, and a remote temperature sensor connection point to sense temperatures within the environment being heated.

FIG. 3B is a schematic perspective view of remote sensors shown in FIG. 3A.

FIG. 3C is a schematic perspective view of a humidification system shown in FIG. 3A as part of a multi-component system for treatment of an enclosed environment.

FIG. 4A is a schematic perspective view, partially in phantom, of a multi-component system for treating an enclosed environment, in a configuration for de-humidifying air in the environment, showing an air intake hood, a dehumidification chamber, a modulated air inlet air, a water coil attached to a chilled water reservoir where cold water is pulled from a reservoir and pushed through the chilled water coil across a cooling rack back to the reservoir.

FIG. 4B is a schematic perspective view of a portable system useful with a multi-component system.

FIG. 5A is a schematic perspective view, partially in phantom, of a multi-component system for treating an enclosed environment, in a configuration for treating the air in the environment, showing a dehumidification chamber having a device for delivering one or more treatments to the enclosed environment.

FIG. 5B is a schematic perspective view of a filer shown in FIG. 5A.

FIG. 5C is a schematic perspective view, partially in phantom, of a hydroxyl generator shown in FIG. 5A.

FIG. 5D is a schematic perspective view, partially in phantom of an evaporation coil shown in FIG. 5A.

FIG. 6A is a schematic perspective view, partially in phantom, of a multi-component system for treating an enclosed environment, showing a closed modulated air inlet gate having a air inlet shell installed with a gas line and electrical connection.

FIG. 6B is a schematic perspective view of a burner useful to inject heat into a multi-component system described herein.

FIG. 6C is a schematic perspective view, partially in phantom of a direct spark ignition and flame rod useful with a multi-component system described herein.

FIG. 7A is a schematic perspective view, partially in phantom, of a multi-component system for treating an enclosed environment, showing a optional gas engine to operate a blower with an inverter from a battery to produce power for electrical controls.

FIG. 7B is a schematic perspective view of a gas engine shown in FIG. 7A, showing the gas engine engaged to operate with a drive shaft mounted on the system.

FIG. 7C is a schematic perspective view of the gas engine shown in FIG. 7A in position adjacent a main airflow dual inlet blower.

FIG. 8A is a schematic exploded perspective view of a burner box and a control system for use with a multi-component system for treating an enclosed environment, showing a safety interlocks and controls.

FIG. 8B is a schematic perspective view of a part of an enclosed environment, showing a multi-component system positioned in the enclosed environment, for treating the enclosed environment.

FIG. 8C is a schematic perspective view of portions of a humidification system of the multi-component system shown in FIG. 8B.

FIG. 8D is a schematic perspective view of a gas gauge device shown in FIG. 8A.

FIG. 8E is a schematic perspective view of a remote control box shown in the system of FIG. 8A.

FIG. 9A is a schematic perspective view of a portion of a multi-component system for treating an enclosed environment, showing how such system can be placed in the enclosed environment, in a stationary manner.

FIG. 9B is a schematic perspective view, partially in phantom, of a portion of a multi-component system for treating an enclosed environment, showing how such system can be placed in the enclosed environment, in a portable manner.

FIG. 10A is a schematic perspective view, partially in phantom, of a portion of a multi-component system for treating an enclosed environment, configured to purge the environment with fresh air from outside the environment.

FIG. 10 B is a schematic perspective view of the system of FIG. 10, having a door sleeve with an access to the environment, and a rain shield at the doorway, thus allowing the system to be a barrier between an external environment, and the enclosed environment.

FIG. 11A is a schematic illustration showing use of multi-component systems, as described herein, positioned to treat an enclosed environment.

FIG. 11B is a schematic perspective view of a first multi-component system for treating an enclosed environment, showing an air inlet shell attached to such first system to drawing fresh air from outside the environment.

FIG. 11C is a schematic perspective view of a second multi-component system to inject heat, which second system is positioned within a doorway of the enclosed environment and having operational controls outside the enclosed environment.

FIG. 12A is a schematic perspective view, partially, in phantom, of a multi-component system for treating an enclosed environment, having a distribution system attached thereto, and having flexible ducts that disperse heated air to remote locations within the enclosed environment.

FIG. 12B is a schematic perspective view of a gas supply for the system shown in FIG. 12A.

FIG. 12C is a schematic perspective view, partially in phantom, of a canister wrap for the gas supply shown in FIG. 12B.

FIG. 12D is a schematic perspective view of a distribution system for the multi-component system shown in FIG. 12A, showing the flexible ducts in a stored position.

FIG. 13A is a schematic perspective view, partially, in phantom, of a distribution system that can be attached to a multi-component system for treating an enclosed environment; and, having flexible ducts that disperse heated air to remote locations within the enclosed environment; and, further having a system for further treating the enclosed environment with dispersed materials, ions, scents, and the like.

FIG. 13B is a schematic perspective view of a bag-style filter that can be used with the system shown in FIG. 13A.

FIG. 13C is a schematic perspective view of a flat panel filter that can be used with the system shown in FIG. 13A.

FIG. 13D is a schematic perspective view, partially, in phantom, of a distribution system that can be attached to a multi-component system for treating an enclosed environment, having containing filters on outlet, and a removable lid where filters can also be attached.

FIG. 13E is a schematic perspective view of a hydroxyl generator module useful in a distribution box shown in FIG. 13D.

FIG. 14B is a schematic plan view of an enclosed environment (e.g., a home) showing a multi-component system for treating an enclosed environment, where such system is positioned in a doorway to create a barrier to the enclosed environment, and where such system is shown with a distribution system in an exhaust or purge configuration.

FIG. 15A is a schematic perspective view, partially in phantom, of a stationary heat injector operating as a direct gas-fired duct heater, useful with a multi-component system described herein.

FIG. 15B is a schematic perspective view, partially in phantom, of a humidification system useful with the heat injector shown in FIG. 15A.

FIG. 15C is a schematic perspective view of a flow control calve useful with a humidification system.

FIG. 15D is a schematic perspective view of a heat injector module useful with a multi-component system described herein.

FIG. 15E is a schematic perspective view of a portion of a humidification system useful with a multi-component system described herein.

FIG. 15F is a schematic perspective view of a portion of the humidification system shown in FIG. 15E.

FIG. 16A is a schematic perspective view of a direct gas-fired burner useful in a duct where an air-to-fuel ratio is established by constraining the airflow with a profile plate within the duct.

FIG. 16B is s schematic perspective view of a profile plate shown in FIG. 16A, showing an accumulation tube.

FIG. 16C is a schematic perspective view of the accumulation tube shown in FIG. 16B.

FIG. 18 is a flow chart depicting the steps of a non-limiting method for heat treatment using a multi-component system.

FIG. 20 is a flow chart depicting the steps of a non-limiting method for water remediation from an enclosed environment using a multi-component system.

DETAILED DESCRIPTION OF THE INVENTION

Figure 3D:
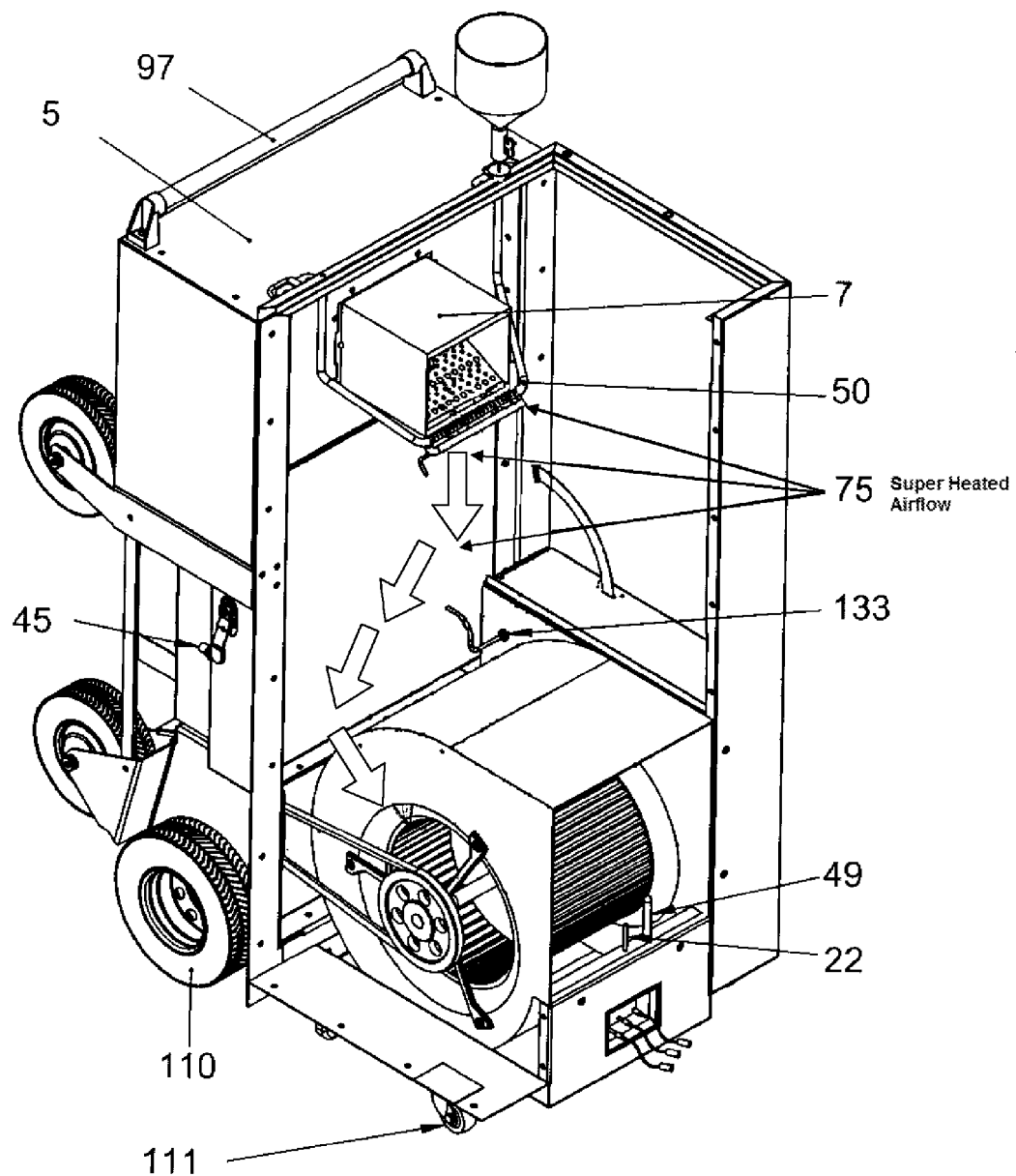
FIG. 3D is a schematic perspective view of a multi-component system for treating an enclosed environment, in a configuration for humidifying air in the environment. The path of super heated airflow from the burner to a main airflow dual inlet blower of one embodiment of a multi-component system is illustrated.

Described herein is a multi-component system for providing heated replacement or recirculated air to an enclosed environment. In certain embodiments, the system can be configured to further condition the airflow using one or more of a humidification system, a dehumidification system, and freshening/de-odorizing/purifying system.

For ease of explanation, the various embodiments shown herein having common elements retain the same reference numbers throughout. For example, the following reference numbers refer to the following elements in the listed Figures:

| Ref. # | Element | FIGS. |
|---|---|---|
| 1 | Exit of heated airflow | 8B |
| 2 | Air Inlet Shell | 6A, 11B |
| 3 | Airflow Adjustment | 2B, 17 |
| 4 | Airflow Sensor | 8B |
| 5 | Burner Box | 1A, 2A, 3A, 6A, 8B, 9A, 9B, 15A |
| 6 | Burner Manifold | 6B, 8A |
| 7 | Direct Gas-Fired Burner | 3A, 6B, 8A |
| 8 | Canister Wrap | 12B |
| 9 | Chilled Water Coil | 4A, 15A, 16A |
| 10 | Chilled Water Reservoir | 4A |
| 11 | Cinch Connector | 1A, 4A, 5A, 6A, 11B, 12A |
| 12 | Combustion Air Pressure Switch | 8A |
| 13 | Condensing Coil | 5A |
| 14 | Condensing Pan | 4A, 5A |
| 15 | Evaporation Coil in dehumidification chamber with DX | 5D |
| 16 | Dedicated Combustion Blower | 1A, 6A, 8A |
| 17 | Dehumidification Chamber | 4A, 5A |
| 18 | Opening | 6A |
| 19 | Thermostat | 8E |
| 20 | Direct Spark Ignition | 6C |
| 21 | Discharge on the portable heat injector | 9A, 9B, 11B |
| 22 | Discharge Air Temperature Sensor | 3A, 8B |
| 23 | Distribution Box | 1A, 12A, 12D, 13A, 14A, 14B |
| 24 | Flat Panel filter for Distribution Box | 12D, 13C |
| 25 | Flexible Distribution Duct | 11B, 12A, 12D, 13A |
| 26 | Distribution System | 12D |
| 27 | Doorway | 8A, 9A, 9B, 10B, 11C |
| 28 | Working Section of Humidification Tube | 3C, 15F |
| 29 | Fluid Level Sensor for Accumulation Tube | 15D |
| 30 | Duct Pressure Gauge | 8A |
| 31 | Duct Pressure Switch | 8A, 17 |
| 32 | Electrical Connection | 6A, 11B |
| 33 | Control Panel | 1A, 2B, 8A, 11C, 15D |
| 34 | Hydroxyl Generator | 5C, 13A, 13D, 13E |
| 35 | Flame Rod | 6C |
| 36 | Flame Safeguard System/Flame Management | 2B |
| 37 | Fluid Inlet to humidification tube | 3C, 15A, 15E |
| 38 | Steam Release Cuts/Slits in Humidification Tube | 3C, 15F |

| Ref. # | Element | FIGS. |
|---|---|---|
| 39 | Temperature Sensor | 3C, 15D |
| 40 | Fluid Delivery System | 3C, 15C |
| 41 | Fork Lifting Pockets | 2A |
| 42 | Flow through gas valve | 1A, 1B, 8A |
| 43 | Gas Gauge | 8D |
| 44 | Gas Inlet Manifold | 8D |
| 45 | Gas Line Connection/Gas Line | 3A, 6A, 8D, 9A, 14A |
| 46 | Gas Modulation Valve and actuator | 8A |
| 47 | Heated Environment | 8B, 11B, 12A, 14A |
| 48 | High Gas Pressure Switch | 1B, 8A |
| 49 | High Temperature Limit | 3A, 8B |
| 50 | Humidification Tube | 3A, 3C |
| 51 | Injection Chamber | 1A, 9A, 9B, 15A |
| 52 | Injection Chamber Airflow Switch | 8A |
| 53 | Injection Chamber Filter | 9A |
| 54 | Fresh air inlet | 1A, 7A, 9A, 9B, 10B, 14B |
| 55 | Louvered Inlet | 8B |
| 56 | Low Fire Position Switch | 8A |
| 57 | Low Gas Pressure Switch | 1B, 8A |
| 58 | Main Airflow Dual Inlet Blower | 2A, 7C |
| 59 | Modulated Air Inlet | 1A, 11C |
| 60 | Modulated Air Inlet Damper | 2A |
| 61 | Modulated Air Inlet Gate | 2A, 6A |
| 62 | Rigid duct | 4A, 5A |
| 63 | Motor | 1C, 17 |
| 64 | Multiple-Port Gas Manifold | 12C |
| 65 | Inlet Cinch Connector | 1A, 12A |
| 66 | Exhaust location in the structure for purge | 14B |
| 67 | Pressurizing Snorkel | 12B |
| 68 | Propane Tank/Canisters | 12C |
| 69 | Intake hood set up to Purge | 2A, 14B |
| 70 | Rain Shield | 10B |
| 71 | Intake hood set up to Recirculate | 1A, 5A, 11C, 12A |
| 72 | Second Stage Gas Regulator | 1B, 8A |
| 73 | Remote Control Box | 8E |
| 74 | Structure | 8B, 11A, 14A, 14B |
| 75 | Super Heated Airflow | 3A, 15D, 16B |
| 76 | Temperature Control System | 2B |
| 77 | The Portable Heat Injector System | 1A, 4A, 7A, 10B, 14A, 14B |
| 78 | V Bank filter | 9B |
| 79 | Variable Frequency Drive(VFD) | 2B, 17 |
| 80 | Velocity Cones | 12A |
| 81 | Water Pump | 4A |
| 82 | Cinched Duct Splitter | 12C |
| 83 | Solid Fabric Panel | 2A, 11C, 12D, 14A |
| 84 | Flow through opening in accumulation tube | 15E |
| 85 | First Stage Regulator | 12C |
| 86 | Heat Shower | 12A |
| 87 | End of Duct Module | 12A |
| 88 | Cinch-to-Cinch connectors | 12A |
| 89 | Combustion air inlet | 7A |
| 90 | Motorized Stair Climber | 4B |
| 91 | On-Board Battery for hand truck | 4B |
| 92 | Cooling Rack | 4A |
| 93 | Remote Sensors | 3B |
| 94 | Sockets | 2A, 3B, 11B |
| 95 | Drain on Accumulation Tube | 3C, 15B |
| 96 | Discharge Cinch Connector | 12B |
| 97 | Handle | 1A, 2A, 3A, 6A, 11B, 11C, 12D |
| 98 | Air Intake on portable heat injector | 1A, 4A, 5A, 6A, 11B |
| 99 | Cold Air Return | 14A |
| 100 | Remote Discharge Location | 14A, 14B |
| 101 | Door sleeve | 9A, 9B, 10B |
| 102 | Dehumidifier Air Inlet | 4A |
| 103 | Dehumidifier Filtered Air Inlet | 4A, 5B |
| 104 | High Pressure Area | 14A, 14B |
| 105 | Low Pressure Area | 14A, 14B |
| 106 | Fluid Release Valve | 3C, 15C |
| 107 | Direct Exchange Cooling System | 5A |
| 108 | Diverted Modulated Air Inlet | 7A |
| 109 | Water Chiller | 4A |
| 110 | Wheels | 1A, 3A, 12D |
| 111 | Casters | 1A, 3A |
| 112 | Heat Dispersion Channels | 15E |
| 113 | Filter Box set up | 15D |
| 114 | Magneto | 7B |
| 115 | Accumulation Tube | 3C, 15D, 16B |
| 116 | Access Panel | 10A |
| 117 | Heat Injector Module | 15D |
| 118 | Dispersion Fin | 8C |
| 119 | Gas Engine Power source | 7C |
| 120 | Ignition Transformer | 8A |
| 121 | DC to AC Inverter | 7A |
| 122 | Engagement Pulley | 7B |
| 123 | Drive Shaft | 7B |
| 124 | Profile Plates | 16A |
| 125 | In-line burner | 16B |
| 126 | Combustion chamber | 16A |
| 127 | Bag style filters for the Filter Box | 13B, 13D |
| 128 | Battery for gas engine | 7A |
| 129 | UVA Light to produce hydroxyls | 5C, 13E |
| 130 | Special coated grid to produce hydroxyls | 5C, 13E |
| 131 | ION Generator | 5C, 13E |
| 132 | Filter Retaining grid | 13A |
| 133 | Modulated Air Inlet Pressure Sensor | 3A |
| 134 | Metering Valves | 15C |
| 135 | Top resistor | 17 |

A multi-component system 77 is generally shown in FIGS. 1-7. The system 77 can be configured in stationary, moveable, and/or portable configurations to efficiently supply heat and to incorporate various additional accessory system (e.g., humidification, de-humidification, purifying, etc.) into the heating system to humidify, dehumidify, and/or sanitize the discharged airflow.

The multi-component system 77 itself can act as a barrier to the heated enclosed environment, and with the utilization of a distribution system, can heat the enclosed environment with elevated temperatures. The multi-component system can also be configured for eradicating pests, disease germs, viruses, mold, bacteria, and the like. The multi-component system is also useful for smoke and water remediation and heat sanitization.

The multi-component system can be used to purge an environment with fresh air, to dehumidify, to decontaminate, or to sanitize an environment. The multi-component system can also add humidity and fluid-based medicines or scents to the air being discharged by such system, as well as be used to dissipate the injected heat into the airflow being heated.

The multi-component system is generally configured to substantially prevent its motors and controls from being subjected to the elevated heat of an enclosed environment, and greatly diminishes energy loss from the enclosed environment.

The multi-component system herein generally includes a heat injector module having a burner box module 5 and an injection chamber 51. As depicted in FIGS. 8A-8E, the burner box 5 module can generally include a gas-fired burner 7 with a dedicated combustion blower 16, a second stage gas regulator 72, a low gas pressure switch 57, a high gas pressure switch 48, dual main gas control valves 42, a gas modulation valve with actuator 46, a low fire position switch 56, an ignition transformer 120, an injection chamber airflow switch 52, and a pressure switch to confirm combustion air 12. A control panel 33 houses a flame management system 36 which utilizes direct spark ignition 20 and senses the flame with a flame rod 35.

The control panel 33 can also include a variable frequency drive (VFD) 79 which can be controlled by an airflow adjustment potentiometer 3 for the main blower motor 63, and a temperature controller 76. A gas modulation valve actuator 46 can be used to achieve a desired discharge temperature. For specific applications, the system can interface with remote controls 73 and remote sensors 93.

In an embodiment of a multi-component system that is configured to supply 400,000 BTU/h and to be portable or moveable to different enclosed embodiments (where, for example, the weight for the system may be about 400 pounds), the system can be easily transported with the use of wheels 110 and castors 111 along with a handle 97. The placement of wheels 110 allows the system to be moved vertically, horizontally, or in a balanced diagonal position with the system being stable in each position. The weight distribution over four wheels allows the system to move easily through lawns and down gravel driveways to the locations where portable heat is desired. Also, in certain embodiments, the system can include the attachment of a motorized stair climber 90 to move the system up and down stairs with the power from an on-board battery 91. In other embodiments, forklift pockets 41 allow the system to be moveable. The portability of the present multi-component system and the ability to configure such system to incorporate different operational modules provides great benefits to the HVAC markets.

The burner 7 can be designed to burn natural gas, propane or a range of synthetic gases. As a non-limiting example, the burner 7 may burn synthetic gas created from the decomposition of tires. The regulated output of the second stage gas regulator 72 is set based upon the BTU potential of the gas. The low fire position of the modulated gas control valve 46 passes sufficient amounts of gas at this regulated pressure to establish a very small flame the full length of the burner 7. The direct gas-fired burner 7 is very efficient and has a significant turn-down ratio. In one particular embodiment, the burner 7 can operate from a minimum of about 12,500 BTU/h up to 400,000 BTU/h. In this embodiment, with about 4,000 cfm through the injection chamber 51, the temperature rise would range from a minimum of about 3° F. to up to about 90° F. with maximum BTU output. The discharge temperature 76 and the speed 3 of the main airflow blower 58 can be adjusted independently without adversely affecting the efficient heat being injected, thereby utilizing the capabilities of the burner to achieve significant temperature rises in smaller volumes of air. The process of adjusting the airflow 3 given the BTU rate can also be automated, where the BTU rate is fixed and the volume of air through the injection chamber 51 is modulated with the variable frequency drive 79 instead of the gas.

The system 77 may contain safety protocol. For example, when the heat enable signal is given by the operator at the control panel 33, a series of safety interlocks can be satisfied before the redundant, main gas valves 42 are opened and the gas is ignited. The interlocks can be comprised of the low gas pressure switch 57, the high gas pressure switch 48, confirmation of airflow in the injection chamber with the airflow switch 52, confirmation of combustion air pressure as sensed with a pressure switch 12 on the burner's manifold 6, and the gas modulation valve 46 (which, in turn, is confirmed to be in the low fire position with the low fire position switch 56 before the direct spark ignition 20). A flame management system 36 continually monitors the flame with a flame rod 35. The temperature controller modulates the actuator for the gas modulation valve 46 to achieve the desired discharge temperature. In this embodiment, as an additional safeguard, an independent high temperature limit 49 senses the discharge temperature. If the temperature reaches the high temperature limit, all the power is removed from the flame management system 36, thereby closing the main gas control valves 42. The high temperature limit 49 and the high gas pressure switch 48 require a manual reset.

The system senses the blended air temperature on the discharge 21 of the blower with a thermocouple 22 as input to the on-board temperature controller 76, which supplies the voltage input to actuate the gas modulation control valve 46 to maintain the operator chosen discharge air temperatures. In certain embodiments, the set-up parameters limit the maximum discharge temperature to about 180° F. due to limitation of the fan bearings; but in other embodiments, the discharge 21 can be made to reach about 400° F. It is to be understood that still other embodiments with higher discharge temperatures can be configured with insulation and/or larger air gaps to ensure the motors and controls are within their operational limits. The gas supply to the portable, moveable, and stationary heat injector can be natural gas or propane, though other gases or a blend of gases may be used.

In certain embodiments, the system 77 can be used with any size propane canisters 68 as a gas source. For example, smaller sizes of canisters 68 can be mounted in parallel by utilizing a multi-port gas manifold 64. In certain embodiments, there are multiple small propane canisters 68 with first stage regulators 85 ported into a multi-port gas manifold 64 to place the vapor pressures of the canisters in parallel. The manifold 64 then feeds a second stage gas regulator 72 on the system through a flexible hose; where the size is sufficient to maintain the required gas pressure during the maximum gas flow. In one embodiment, a gas gauge 43 on the multi-port gas manifold 64 and a gas gauge on the gas inlet prior to the second stage gas regulator 72 show the gas pressures at the source and the destination to ensure the gas source and gas line 45 are sufficient at full gas flow. When the outside air temperature is low and the gas supply is not sufficient at full airflow, the air volume through the injection chamber 51 can be reduced to require less gas pressure to achieve the desired discharge temperature.

In certain embodiments utilizing a ducted discharge 21, a canister wrap 8 can be used to allow warm air from the discharge 21 to flow over the propane canisters 68 to warm them, increase the evaporation rate, and therefore increase the vapor pressure. In particular embodiments, the discharge 21 air of the system is transitioned to connect directly to a flexible duct 25 with a fabric discharge cinch connector 96 attached to the discharge 21 with a Velcro-type connection. The discharge cinch connector 96 that attaches a main duct 25 to the discharge 21 of portable heat injector has a top port that may be opened and a cinch connector 11 added to connect a pressurized snorkel 67. The flexible duct 25 can then convey heated airflow from the pressurized discharge cinch connector 96 through the intake hood 71 to the canister wrap 8. The pressurized snorkel 67 gets pressure to push heat into the canister wrap 8 based upon the static load of the distribution duct 25 attached to the discharge 21. The canister wrap 8 may comprise an insulated material to retain heat and effectively route the airflow across the propane canisters 68. By way of non-limiting example, the propane canisters 68 can be set inside the canister wrap 8 with openings that have closures to allow propane canisters 68 to be changed, access to the gas manifold 44 and the gas hose connection to the system. In certain embodiments, the canister wrap 8 is designed to fit the propane canisters 68 which are most portable and the most affected by cold temperatures.

As one example, the system 77 can be plugged into any 120 vac outlet to supply power to electrical controls 32 and a variable frequency drive (VFD) 79 that converts the 120 volt single phase to 230 volt 3 phase to vary the speed of the premium efficiency 1.5 HP, 230 volt, 3 phase motor 63. The maximum VFD 79 frequency is established by monitoring the current draw of the motor 63 with the non-ducted discharge 21.

As shown in FIGS. 10, 11, 12, the blower is capable of moving high volumes of air through the distribution system 26, which can be connected directly to the discharge 21. With the addition of the distribution system 26, the static load causes less air to be moved and the current draw of the motor 63 is reduced.

A duct pressure switch 31 may be installed on the discharge 21 of the main airflow blower 58 to sense the static load of the distribution system 26. As the static load increases, causing the current draw on the motor 63 to be reduced sufficiently, the duct pressure switch 31 closes to shunt a resistor on the adjustable speed input to the variable frequency drive (VFD) 79 to increase the adjustable speed input voltage on the VFD 79 and therefore increase the motor 63 speed with an increased static load on the discharge 21. When the static load is removed, the pressure switch 31 opens causing the adjustable speed input voltage to the VFD 79 to be reduced to the initial speed setting. This feature is called the HP Boost. In other embodiments, a programmable logic controller (PLC) or a full featured VFD with a constant current option can be used as methods to maximize the airflow as the static loads vary. With the HP Boost; a resistor 135 is shunted by the closed contacts from a pressure switch 31 but the dynamic capability that it gives to the system 77 is significant. The motor speed is set to move maximum airflow with an unducted discharge 21; limited by the maximum power that can be supplied 32 with the 1 HP VFD 79 and the range typical house circuit 32.

The current draw on the motor 63 is a function of the work performed by the blower 58; when the static of the distribution system 26 causes the blower 58 to move less air the motor 63 draws less current. The speed of the motor 63 can be increased when under this static load to increase the maximum airflow while under load with the dynamic engagement of the HP Boost Concept. When the static load is removed, the HP Boost is disengaged.

In the HP Boost (which dynamically adjusts the speed of the motor 63), the low voltage VFD's; with 120 vac input and 230 volt, 3 phase output, do not have a means to automatically make speed adjustments based upon current draw. The volume of air being moved at a specific discharge temperature determines how much BTU energy that can be applied to an environment so maximum airflow while under a static load is desired for an optimal performance of the portable heat injector. In certain embodiments, it may be desirable to make the speed adjustment automated; that is, engage when the sensed static pressure limit is hit, and disengage when the static load is removed. In such configuration, failure to make the adjustment when the static load is removed would cause the VFD 79 to produce a fault and shut down.

The HP Boost can also be engaged when the static load on the inlet to the blower 58 becomes sufficient to cause the current draw on the motor 63 to decrease significantly. This can occur, for example, when accessories are added to the modulated air inlet 59 and the modulation damper 60 is employed to restrict airflow through the injection chamber 51 to draw airflow through the accessory or with the addition of an air intake filter 53.

The HP Boost pressure switch 31, when sensing the static load on the blower inlet 133, can engage the HP Boost based upon a different sensed pressure. The intake filter arrangement for larger systems can use a V bank filter 78 arrangement to employ more filter media, thereby reducing the static load on the blower 58. The HP Boost can be engaged dynamically when sensing a significant static load on either the inlet 133 or the discharge of the blower 21.

In operation, as the static load on the blower 58 increases the volume of air decreases, as does the current draw, so the normally open contacts of the HP Boost pressure switch 31 are set to close when the static pressure increases sufficiently to decrease the current draw of the motor 63. The closed contacts from the pressure switch 31 removes the effect of the top resistor 135; causing the motor 63 to operate at the maximum allowed speed as determine by a speed limit field on the VFD 79. This speed limit field is set by evaluating the current draw of the motor 63; with the static load that closed the contacts of the pressure switch 31. This speed limit is input as a parameter in the VFD 79 so when the top resistor 135 is shunted with the closed contacts, the VFD 79 goes to the speed limit setting. In other embodiments, the HP Boost speed can also be established by breaking a top resistor 135 into a variable resistor and a fixed position resistor; the variable resistor being used to determine the maximum speed when under load and the fixed resister shunted by the contacts from the pressure switch 31.

Figure 14A:
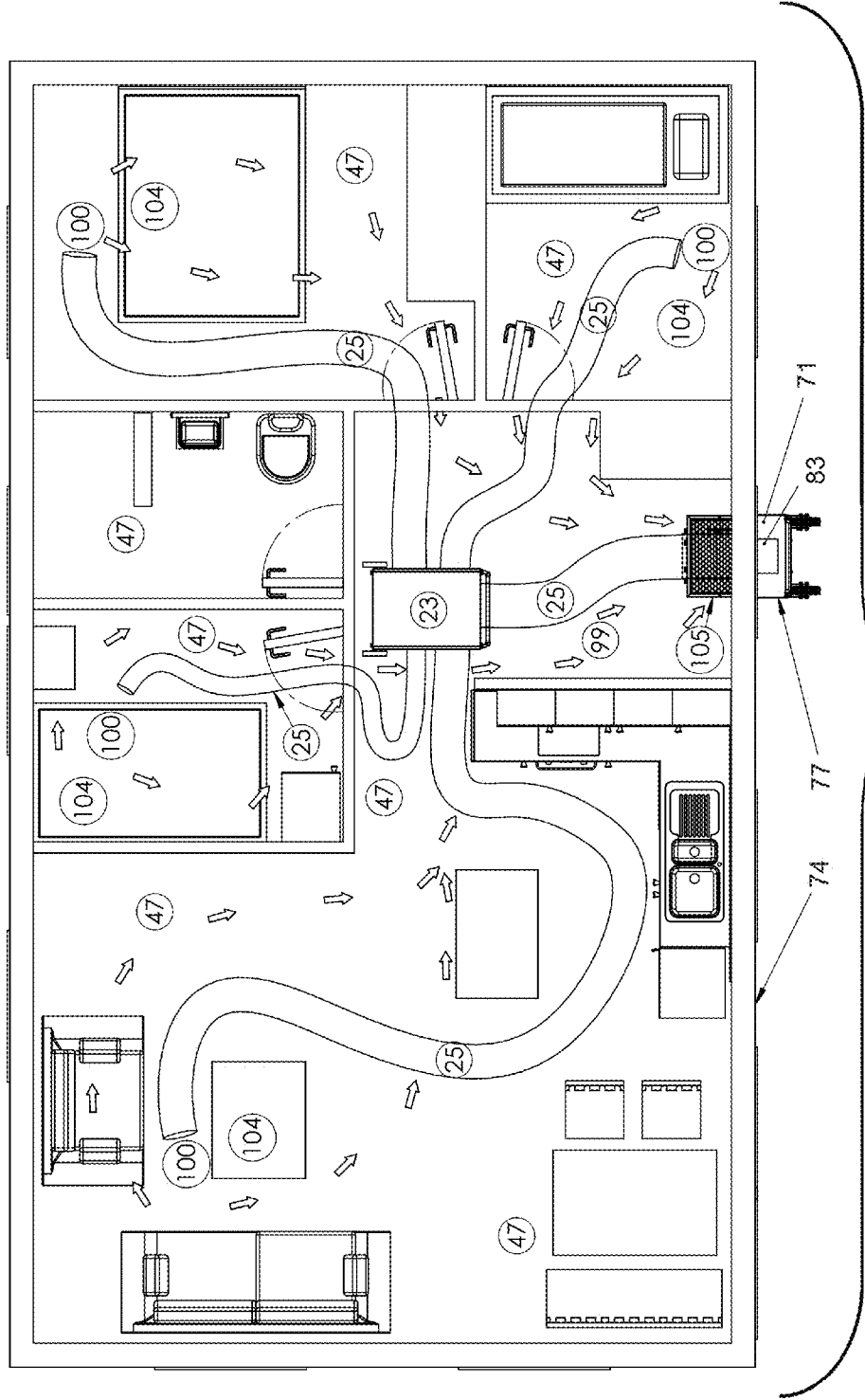
FIG. 14A is a schematic plan view of an enclosed environment (e.g., a home) showing a multi-component system for treating an enclosed environment, where such system is positioned in a doorway to create a barrier to the enclosed environment, and where such system is shown with a distribution system in a re-circulation configuration.

As generally shown in FIGS. 14A-14B, the system 77 can be positioned within an enclosure to heat an enclosed environment 47 where it is located to comfort heat levels. The portable system 77 can operate safely with the system positioned vertically, diagonally, or horizontally to create different airflow paths. In the vertical position, an air intake 98 pulls air from the room, heats it, and discharges it at floor level. In the horizontal position, the air intake 98 pulls the cool air from the lower part of the room and discharges the heat vertically upward. This portable system 77 may also be attached directly to the permanent ductwork of the enclosed environment 74 on a temporary and portable basis for emergency heat, or to supply heat during the construction process by connecting the discharge 21 to the heated supply for the environment 74 and allowing the cold air return 99 to flow through the environment back to the air intake 98. When access to the existing duct is not possible, a flexible duct 25 can also be attached to the discharge 21 to push heated air to remote locations 100 within an environment 74. The heated air delivers BTU energy to the discharge area 100 to warm the area and all the objects in the area with the resulting BTU energy dissipated into the air and the objects within the environment 74 as it moves toward the air intake 98 to be reheated. The system 77 allows the volume of air to be adjusted without affecting the clean burn characteristics of the burner 7, thereby allowing the system 77 to be adaptive to many embodiments for portable and temporary use as well as permanent applications.

As generally shown in FIGS. 9-11 and FIGS. 14A-14B, the system 77 can be positioned in almost any doorway 27 with the door to the environment 74 left open or removed while the portable system is positioned in the doorway 27. An air intake hood 71, positioned on top of the portable system, creates the barrier of the heated environment 47 within the environment 74. The air intake hood acts as an air inlet damper to draw air from either inside the environment 71 or from outside the environment 69, by either repositioning or reconfiguring the intake hood. The door 27 sizes vary slightly from one environment 74 to another so the gap around the top and sides may be filled with foam pieces, an inflatable tube seal, or with the use of close-off's containing magnets or Velcro-type closures to form the heated air barrier.

With the system 77 creating the barrier to the heated environment 47, the gas line connection 45, all the electrical controls, and the motors are outside the heated environment 47. If only part of the environment 74 is to be heated, the system 77 may be positioned within an internal doorway 27 to form a barrier to the heated environment 47. In this embodiment, the propane canisters 68 are left outside and only the hoses enter the environment 74.

In other embodiments, the system 77 with an air intake hood 71 on top is positioned inside the environment 74, about the depth of the swinging door, with the use of a door sleeve 101 to create a vestibule inside the doorway 27. The door sleeve 101 forms a barrier to the heated environment 47 at the doorway 27 by closing-off the sides and top of the vestibule area and sealing the connection to the system 77 and the door frame. On one side of the door sleeve 101 an opening is formed to allow the operator access to the heated environment 47. The access opening is closed with an access panel 116 that may contain a zipper, Velcro, or some mechanical means to form the barrier. The door sleeve 101 can be made from fabric or rigid panels that are light and easily transported. The door sleeve 101 can be incorporated into larger systems where the door sleeve 101 forms a vestibule for a more permanent installation with rigid panels and a lockable access door 116. A rain shield 70 at the doorway 27 prevents rain from entering the environment 74. The rain shield 70 can be made of a fabric that attaches to the door frame or to the door sleeve 101. The rain shield 70 can attach to the door frame to allow easy access to the vestibule area to access the environment 74 and to operate the system 77. The rain shield 70 can have an opening at the bottom to allow the gas hose and fresh air 54 to enter the vestibule area as required for the system 77. The rain shield 70 can also be used as a privacy shield to prevent passersby from having visual contact of the process being performed or to display advertising for the operator performing the heat treating process.

In embodiments for a portable and moveable direct gas-fired heat injector system, the system 77 can be made to draw air through an opening within the environment 74 such as a personnel door opening 27 by employing the rigid, pass-through door sleeve 101 as the air intake. The door sleeve 101 holds the door to the outside open causing the opening 27 to act as the air intake vestibule, and adds an additional door 116 for personnel egress within the environment 74. With the air intake hood 69 repositioned, the air intake draws air from within the environment, injects the required BTU energy and discharges the heated air within the environment 74. The airflow for the dedicated combustion blower and the optional modulated air 59 inlet will continue to be drawn from outside the heated environment through the door sleeve, acting as a vestibule.

In a particular embodiment (see FIG. 8B), the injection chamber 51 can be mounted to a louvered air inlet 55 on the side wall of a building. Fresh air is drawn in through louvers 55 and through the injection chamber 51 with the force of the negative pressure within the enclosed environment 74; created by a process within the environment 74 that exhausts air, as would be normal for the removal of airborne particulate and fumes. The low static load of the stationary heat injector 117 allows significant and variable volumes of replacement air to pass through the injection chamber 51 and into the environment 74 without the use of a directly connected blower. The operational system can engage the heat injector when the system is activated and there is a call for heat; as would be common from the closed set of contacts on a thermostat 19 within the environment 74. Additional interlocks can be used to engage the stationary heat injector 117, and can include an airflow sensor 4 to confirm the direction and velocity of the airflow on the inlet duct leading to the injection chamber 51, along with a pressure sensor 31 to sense duct pressure with respect to the outside environment. A temperature controller 76, sensing the blended air temperature 22 at the exit of heated airflow 1, modulates the gas control valve 46 to inject sufficient heat to achieve the desired discharge temperature. When the airflow through the injection chamber 51 falls below a sensed low speed, the injection of heat is suspended. This heating of replacement air is possible with the low static of the injection chamber.

The heat injector module 117 can be configured as a direct gas-fired duct heater 7 when applied to a duct 25 with airflow; where the functions of the air intake 98 and the main airflow blower 58 are performed by another system causing the duct to become the injection chamber 51. The heat injector module 117 can be used where the injection chamber 51 is a negative pressure. The air can be drawn through the injection chamber 51, or can be applied to an injection chamber 51 with a positive pressure; the air being pushed through the injection chamber 51.

The positive pressure requires additional combustion motor 16 controls to maintain a manifold 44 pressure on the burner 7 with respect to the positive duct 25 pressure. The heat injector module 117, applied as a direct gas-fired duct heater, includes the airflow sensor 4 interlock. The gas modulation 46 is controlled with a temperature controller 76 that senses the blended air temperature. This configuration of the system allows the injection of heat into any duct that has airflow, without the static load of the burner 7. The airflow can be variable without affecting the air-to-fuel ratio of the burner 7, and the gas can be modulated to achieve the desired blended air temperature.

When the system 77 is positioned within the environment 74 to be heated to elevated temperatures, as may be required for high rise apartments or hotels, an air inlet shell 2 can be used to create the barrier to the heated environment 74. The air inlet shell 2 is attached to the portable system and made to attach a flexible duct 25 with a fabric cinch connector 11 or mechanical clamp on the air inlet shell 2. The gas line 45 and the fresh air pass through the same opening 18 into the flexible duct 25 that leads to the air inlet shell 2. The flexible duct 25 is sealed at the opening to the outside to create a barrier to the heated environment 74. The gas hoses along with the fresh air required for the dedicated combustion blower 16 pass through the opening 18, through the air inlet shell 2, and to the portable system 77. The low pressure gas can be connected with a quick disconnect. The fresh air for the combustion blower flows around the control panel and across the motors to keep them cool while the portable system heats the environment 74 to elevated temperatures. As the environment 74 heats to the elevated temperature, the airflow through the modulated air inlet 59 will be added to the combustion airflow 89 to pressurize the environment as part of the heat treating process and, with the additional fresh airflow through the air inlet shell 2, the motors and controls remain cool.

In an embodiment to purge an environment with heated air (see FIG. 14B, for example), the system 77 can be positioned in an outside doorway 27 of the environment 74 with the air intake hood 69 positioned on top in such a manner to create a barrier to the heated environment 47 and to draw fresh air from outside 54. The environment 47 within the environment 74 is purged by drawing fresh air from outside 54 the environment 74 to create a high pressure area 104 at the point of discharge 100 within the environment 74, causing a purging airflow through the environment 74 to an opening 66 or openings in the environment 74 such as a door or window. The point of discharge can be moved from the discharge at the system 21, to a remote discharge location 100, by attaching flexible ductwork 25 to the discharge 21 of the system 77. With flexible ductwork 25 attached to the discharge 21, the purging airflow is redirected by repositioning the discharge location 100 within the environment 74. The fresh air purge may be required if an environment 74 has smoke or vapors in the air, or to purge the excess heat after an elevated temperature heat process so the normal HVAC system can again manage the temperature control of the environment 74. The system 77 can purge the environment 74 with or without injecting heat into the airflow used for the purge.

The air intake hood can be transitioned from purging 69 the environment 74 with fresh air to re-circulating the air within the environment 74. The environment is heated with re-circulated air with the intake hood 71 positioned to cause the air intake 98 to draw air from inside the environment 74 and discharge heated air, at a regulated temperature, into the environment 74. In such embodiments, the distribution of heated air throughout the environment 74 can use the distribution system 26. In certain embodiments, the distribution system 26 can include a distribution box 23 having a large inlet cinch connector 65 which attaches the large flexible inlet duct 25 to the distribution box 23. The distribution box 23 can have multiple outlets containing cinch connectors 11 to attach flexible duct 25 of different sizes as a way to balance the heat distribution within the environment 74. The unused outlets of the distribution box 23 are closed off with solid fabric panels 83 attached inside the distribution box 23 to the Velcro connection (as the cinch connector). Extra lengths of flexible duct 25 can be added with the cinch-to-cinch connector 88. The output can also be broken into braches with a cinched splitter 82. The high pressure of the discharge 104 creates airflow within the environment 74, from the point of discharge back toward the air intake 98 on the system 77.

It is to be understood that the materials used for the cinch connectors 11 can be a high temperature, low permeable material with casings sewn into the material to contain the cinching cords, strings, or straps. The cinch connecting allows quick set up, and the cinches are easily transported. With a static load and high speed airflow through the flexible duct 25, the duct will expand to its maximum allowable length, so the cinch connectors 11 are made to contain the unused portion of flexible duct 25 to vary the length of the sections of flexible duct 25 as may be required for different sized environments 74.

The distribution box 23 can also be used as a filter box 113 to filter the air being discharged with bag type filters 127 in each of the discharge outlets. When a lid or top is removed, a filter retainer 132 allows the top to also become a filtered discharge.

In certain embodiments (see, for example, FIGS. 13A, 13D, and 13E) a hydroxyl generator module 34 can be installed on an entrance to the filter box 113 which allows the discharge air to be sanitized with airborne free radical hydroxyls. In other embodiments, ultraviolet light 129 rays in the 254 nanometer wavelength or a negative ion generator 131 can be used to eliminate molds, germs, bacteria, or viruses, and to destroy volatile organic compounds. Also, the production of hydroxyl ions can be increased with the application of the humidification tube 50 to release water vapor into the air, upstream from the production of hydroxyls.

In both the portable and stationary embodiments, the discharge of the system 77 can employ a filtered discharge. The bag type filers 127 in the outlets can be used specifically for the type of particulate to be captured. The hydroxyl generator module 34, installed on the entrance to filtered discharge, chemically treats the air that might be recirculated from the heated environment 47 or from outside the environment 74, depending on the positioning of the intake damper or hood.

The production of hydroxyls can be increased with moisture in the air when the water molecule is ionized to create the hydroxyl ion. The humidification tube 50 can be employed in the injection chamber 51, and be positioned in the super heated airflow 75 to release water vapor into the discharged air to increase the production of hydroxyls in the heated air. The employment of the humidification tube 50 also can be used to distribute or release medicine into the air to treat contaminates in the air. This embodiment thus provides a system to decontaminate air with heat, mechanical filtration, chemical reactions, and medicine, in order to treat contaminates or lessen the effect of an untreated contaminate.

Referring again generally to the distribution system 26, the outlets of the distribution box 23 can be filtered by installing filters 24 inside the distribution box 23. The distribution box 23 can also be used as a filter box 113 by replacing a solid top/lid with a filter retainer which also allows the hydroxyl generator 34 to be located within the filter box 113. Flat filter panels 24 or bag type filters 127 can be placed in the outlets to filter the heated air and discharge it into the environment. There may be a duct pressure gauge 30 to sense the static pressure on the discharge 21 of the system 77 to inform the operator of the static load of the filter box 113 as a method to know when to change the filters. The distribution box 23 can also be attached directly to the discharge 21 of the system 77 to discharged air in multiple directions starting at the main discharge 21, a feature to be used when the system 77 is positioned in the doorway of a hallway.

The distribution box 23 can also be configured to function as the storage container for the flexible duct 25 and the cinched duct connectors (see, for example, FIG. 12D), and may contain wheels 110 and a handle 97 to make it portable. The distribution box 23 may be used to transport sufficient ductwork 25 to move air within a typical environment. By way of non-limiting example, a flexible 16" duct 25 in 25' lengths can be cinched into the discharge cinch connector 96 and into the inlet cinch connector 65 to move the discharged air to the distribution box 23 where 25 foot lengths of 10" and 12" flexible duct 25 are attached to the four distribution box 23 outlets using the outlet cinch connectors 11, with cinch-to-cinch connectors 88 to extend the duct 25 to remote locations 100 within the environment 74 to be heated. Fabric velocity cones 80 may be added to the ends of the duct 25 to cause the heated air to be propelled further through the open air space within the heated environment 47.

Referring now to FIGS. 14A-14B, in one method of heating an environment 74 to elevated temperatures, the system 77 can be positioned in the doorway 27 of an environment 74, with the intake hood 71 positioned on top to draw air from within the environment 74 to create a barrier to the heated environment 47. The air is drawn through the air intake 98, heated to a desired discharge temperature, and discharged through a distribution system 26 in order to deposit the heated air to multiple and remote locations 100 within the environment 74, furthest away from the air intake 98. The high pressure at the discharge 104 and the low pressure at the air intake 98 cause a migration of the air through the environment 74 from the high pressure area 104 toward the low pressure area 105. As the heated air moves through the environment 74, it loses BTU energy as it warms the air, the objects, and the environment 74, thereby causing the air temperature to be reduced as it migrates back to the intake. The area around the air intake 98 will be the last to heat up, thereby allowing maximum BTU energy to be added to the environment 74, as measured by the air volume and the temperature rise in that volume.

In a method to apply portable heat with the system 77, where the migration of air within the environment 74 is created by the main airflow blower 58 and with the use of the distribution system 26, no additional fans are required to move air throughout the environment 74. The discharge locations 100 of the distribution duct 25 are easily moved during operation, the airflow can be balanced by installing cinch-to-cinch splitting connectors 82, velocity cones 80, and end of duct modules 87 where special purpose attachments are attached, such as the heat shower 86 employed for large closets and cluttered areas to ensure all areas have been brought up to temperature. As the heated air moves through the environment 74, it will stratify and fill each room with heat, starting at the ceiling to push the cooler air out of the room at the floor, even in rooms that are not within a direct path of the airflow through the environment 74.

In one embodiment, the system 77 has a modulated air inlet 59 that utilizes a split wheel of a forward curve dual inlet blower 58 (which has a solid center divider to structurally strengthen the wheel and to cause the blower's dual inlets to be relatively independent). The dual inlet blower 58 includes a plurality of blades that create a centrifugal force and accomplishes blending of the air. The modulated air inlet gate 61 is located on one side of the blower 58, low in the blower compartment where the low pressure on the inlet to the blower 58 is greatest. The modulated air inlet gate 61 is opened to allow the low pressure to draw airflow through the modulated air inlet 59. The volume of airflow through the modulated air inlet 59 is controlled by adjusting the modulated air inlet damper 60.

The modulated air inlet damper 60 can be positioned in the main airflow between the injection chamber 51 and the main airflow blower 58 on the side opposite drive pulley 122 (for example, as shown in FIGS. 7B-7C).

The modulated air inlet damper 60 can be movable into the main airflow on the side of the dual inlet blower 58 utilizing a cable or a mechanical lever concept to allow the modulated air inlet damper 60 to be operated from outside the injection chamber 51. When the modulated air inlet damper 60 is lowered into the blower compartment to impede airflow coming through the injection chamber 51, the dual inlet blower 58 draws more airflow through the modulated air inlet 59 and can be made to draw significant volumes of air with a high static load. The adjustment of the modulated air inlet damper 60 can be done manually or can be automated with input from sensors added to the modulated air inlet 59, and the sensed air conditions on the air inlet to the remote modules. An independent modulated air inlet 59 can also be created in the dual inlet blower module 58 for a stationary system, allowing the addition of similar modules to condition the air in a path parallel to the injection chamber 51.

The heat injector system 77 allows the volume of air to change without affecting the air-to-fuel ratio on the burner 7 and without affecting the clean burning characteristics. With the engagement of airflow through the modulated air inlet 59, the airflow through the injection chamber 51 is reduced by the volume of air drawn in through the modulated air inlet 59, but the volume of air being discharged remains relatively constant. The amount of BTU energy injected into the reduced volume of air through the injection chamber 51 is adjusted to compensate for the volume of unheated air coming through the modulated air inlet 59 to achieve the desired blended air temperature on the discharge 21.

The modulated air inlet 59 creates a path of airflow parallel to the path through the injection chamber 51. When fresh air from outside the heated environment 54 is drawn in through the modulated air inlet 59, the fresh air it can be used to off-set the air volume being discharged to warm the propane canisters 68 or to pressurize an environment 74. The volume of air drawn in through the modulated air inlet 59 is the pressurizing volume. The pressure within the environment is created when the volume of air being discharged into the environment is greater than the volume being drawn from the environment through the air intake. The method of pressurizing a heated environment during the heat treating process heats all the cracks and small openings in the environment where pests might migrate, to ensure a thorough heat treat process.

The system 77 provides an energy efficient and effective method in performing the elevated heat treating process that is especially useful in the pest control industry and the medical community where the elevated levels of heat provided by the system 77 can kill bed bugs, lice, and many other pests along with disease germs, viruses, bacteria, and mold. The actual kill temperatures and time requirements to eradicate each are well documented. The environment 47 within an environment 74 can be safely heated to these lethal temperatures when all the contents within the environment 74 have been evaluated to ensure they would not become unsafe or damaged by the elevated temperature. The regulated discharge temperature into the environment 74 is typically slightly higher than the desired soaking temperature for the environment 74. The modulation of the gas control valve 46 determines the amount of BTU energy that is added to the air passing through the injection chamber 51 to maintain the operator chosen discharge temperature. The air temperature within the environment 74 cannot become higher than the discharge air temperature.

The system 77 can be positioned as a barrier to the heated environment with the use of the distribution system to cause maximum input of BTU energy throughout the process. The system 77 is also safe because all the motors and electrical controls are outside the heated environment. The system 77 is energy efficient with no duct exposed to the non-heated environment and all the heat from the direct gas-fired burner goes into the environment as compared to the alternative electric heat produced from gas powered generators where multiple levels of inefficiency takes place. The cubic feet of air space, the type of environment 74, the type of floor, the furnishings within the environment 74 and the outside air temperature all factor into the time it will take to achieve the desired eradication temperature.

When air is heated to the elevated temperatures, the relative humidity in the air becomes lower. This low relative humidity could cause damage to the environment 74 or its contents. This problem can be eliminated, however, with the use of a humidification module to increase the humidity in the air being discharged. The system can also be used to release fluid/aerosol/dry powder based medication materials into the air to eradicate pests, disease germs, viruses, bacteria, or other pollutants. The materials being injected could also be used to add scents into the air to mask or eliminate other odors in the air passing through the injection chamber 51.

In the system 77, the humidification tube 50 can installed in the injection chamber 51, downstream from the super heated airflow 75 being injected at an angle to the airflow through the injection chamber 51. As shown in FIG. 3D, the super heated airflow 75 follows a path created by the blending of the airflows. The force from the combustion blower 16 and the propulsion from the combustible gas blended with the perpendicular airflow through the injection chamber. The humidification tube 50 can be positioned in close proximity to the resultant path of super heated airflow 75 downstream from the burner 7 so both radiant and convection heat is transferred into the humidification tube 50. In certain embodiments, the humidification tube 50 is not positioned in the flame, so as to not adversely affect the combustion process.

To humidify with the humidification tube 50, where the super heated airflow 75 is at an angle to the airflow through the injection chamber, a bank of humidification tubes 50 can be used to mix the airflow; to act as a diffusion of the super heated airflow 75, and/or to increase the humidification potential. For stationary systems, the positioning of the multiple humidification tubes 50 downstream from the super heated airflow 75 assists in blending the air to prevent super heated hot spots that might affect a downstream coil 9 or apparatus in the airstream. The method of the utilizing the humidification tube 50 and the bank of humidification tubes 50 can also be applied to direct gas-fired in-line burners 125 where the in-line burner 125 is in the airstream with profile plates 124 around the burner to create the desired air-to-fuel ratio. The super heated airflow 75 in these systems is in-line with the airflow through the combustion chamber 126. The super heated hot spot downstream from the in-line burner 125 is also effective at adding heat to the bank of humidification tubes 50. One benefit from the diffusion properties of this method is the addition of highly efficient humidification where all the heat required to vaporize the fluid goes into the heated airflow. The blower can also be upstream of the burner, as it can be for the indirect heat exchanger. The heat injector module can be used to replace the heat exchanger with the dissipation channels and humidification tubes positioned downstream from the blower. This system of converting from indirect gas-fired heat to direct gas-fired heat with humidification tubes improves the energy efficiency and improves the comfort level of the air being heated.

In certain embodiments, working section 28 of the humidification tube 50 is built into a dissipation channel 112 or has dissipation fins 118. The dissipation channel 112 and fins 118 act as a heat sink to transfer heat into the working section of the humidification tube 28 and disperse the super heated airflow 75. The positioning of the dissipation channel 112 with the working section 28 of the humidification tube 50 allows the fluid to flow down the humidification tube 50 to be heated and produce steam or water vapor, and be dispelled from one or more steam slits 38 and mixed into the airflow through the injection chamber 51. Any fluid remaining at the end of the working section 28 will accumulate in the accumulation tube 115 that also has steam release openings 38, and can also contain flow-through openings 84 to allow heated airflow to evaporate the accumulation of fluid. A fluid level sensor 29, located in the accumulation tube 115, interfaces with a fluid release valve 106 to stop fluid flow when fluid is sensed, in order to prevent overflow.

In certain stationary embodiments (see, for example, FIGS. 15A-15E), a heat injector 117 is applied as a source of heat, upstream from the cooling coil 9. The dissipation channels 112 are inserted between the injected heat and the cooling coil 9 to capture the super heated airflow 75, broadening the heated area and lowering the concentration of heat on the coil 9. The dissipation channels 112 can be of various widths and can be positioned in various configurations to disperse the super heated airflow 75. The dissipation channels 112 can have perforations of various sizes or contain adjustable louvers to better control the dispersion of heat. The humidification tubes 50 can be incorporated into the dissipation channels 112 and/or can have dissipation fins 118 to act as heat sinks to absorb heat in order to increase the energy efficient production of humidity. The humidification tube 50 reduces or eliminates the energy load on the typical system used to humidify the heated airflow, and is based upon the direct correlation that more humidity is required when more heat is added, and when more heat is added, more humidity can be produced.

In the embodiment shown in FIG. 15A-15E, the method to humidify with the humidification tube 50 includes the use of a fluid delivery system 40, a fluid release valve 106, and individual metering valves 134 leading to a fluid inlet 37 for each tube. The fluid connection at the fluid inlet 37 can be uncoupled to prevent back pressure on the fluid line. The fluid inlet 37 can be located within the injection chamber 51 to prevent airflow through the fluid inlet 37 to outside the injection chamber. It is to be understood that the pressure in the injection chamber might be either negative or positive. The fluid flows down the working section 28 containing vapor release slits 38, which are positioned to be heated by superheated airflow 75, leading to the accumulation tube or area 115 having a fluid level sensor 29 and a temperature sensor 39.

The working section 28 of the humidification tube 50 can be a formed tube made of stainless steel or other material that is unaffected by high temperature or the fluids being vaporized. The working section 28 can be positioned between the fluid inlet 37 and the temperature sensor 39. The temperature sensor 39 is generally positioned to sense the temperature of the working section 28. The working section 28 can contain openings 38 on the side facing the airflow, or can be positioned on the sides to thoroughly mix the steam or water vapor with the air flowing through the injection chamber 51. The working section 28 of the humidification tube 50 is generally positioned to receive the super heated airflow downstream from the burner 7.

The humidification tube 50 can be formed to allow the injected fluid to flow to the bottom and puddle in the accumulation tube 115 until the heat of the humidification tube 50 causes the fluid to become a steam or vapor. The formation and sizing of the humidification tube 50 will allow the mounting to be somewhat unlevel without causing fluid to spill from the humidification tube 50. The diameter of the humidification tube will vary based upon the burner size and the desired humidification capacity. The blower typically pulls the air through the injection chamber but it is also possible to push the air so in those applications, the configuration and construction of the dissipation channels may be different.

The fluid inlet 37 of the humidification tube 50 can be formed to have a funnel type inlet that allows a fluid source 40 to be detached from the fluid inlet 37 to prevent back-pressure from the steam from having an effect upon the fluid source 40. The fluid inlet opening for the humidification tube is generally in the injection chamber 51 in order to prevent drawing air from outside the injection clamber 51 into the humidification tube 50. The temperature sensor 39 is inserted into the humidification tube 50 in close proximity to the working section 28 to sense the temperature for operational control of the humidification tube 50. The temperature sensor 39 is tied to the fluid release system 106 to prevent fluid from flowing until the working section is up to operational temperatures.

The fluid delivery system 40 for the fluid inlet 37 to the humidification tube 50 can be gravity fed 40 or from a pressurized source. The fluid source 40 can have a fluid release valve 106 that can either be manual or automated based upon the need for humidity and the sensed temperature of the working section 28 of the humidification tube 50. The rate of flow from the fluid delivery system 40 can also be adjustable manually or automated with an automated humidification control system that senses the humidity in the discharge 21 and considers the sensed temperature 39 of the working section 28.

In an operational humidification system utilizing the humidification tube 50, the fluid release is controlled by the temperature sensor 39, opening the fluid control valve 106 when a temperature known to quickly evaporate the fluid has been reached. The fluid flows down the working section of the humidification tube 28 at a rate controlled by the adjustable flow control valve 134, one for each fluid tube leading to the humidification, where the fluid flow is adjusted based upon the position of the humidification tube. The adjustable flow control valve can be manual or automated to vary the fluid flow based upon the sensed temperature 39 or the desired humidity on the discharge to maintain an effective operational set-point. The fluid that does not transition into steam or evaporate will puddle into the accumulation tube 115, which is the area in the lower part of the tube with a fluid level sensor 29 that interfaces with the fluid release valve 106 to stop the fluid flow until the accumulation is reduced. As a safety device, the accumulation tube 115 may also contain a drain 95 to prevent an overflow. Thus, the fluid delivery system 40 can be gravity fed, fluid supplied with a pump, or a typical water line.

The humidification tube 50 may be effectively employed when the burner 7 has a significant output for extended periods of time, such as when the enclosed environment 74 is being heated to elevated temperatures, or when heating cold outside air, as may be required to replace contaminated air being drawn from an environment 74. The humidification tube 50 is also beneficial as a functional accessory when a continuous volume of cold air, which has a low relative humidity, is heated with a significant temperature rise, causing the relative humidity to become lower. The humidification tube 50 releases water vapor into the air to improve the comfort level of the air, to reduce static electricity, and to enhance the production of airborne free radical hydroxyl ions. The energy efficiency to produce humidity with the humidification tube 50 as an accessory to the direct gas-fired burner is significantly greater than with a dedicated steam-based system. The volume of humidity can be varied, up to the maximum possible based upon the quantity and positioning of the humidification tubes and based upon the dissipation fins or channels that increase the heat transfer from the superheated airflow.

The heat injector module 117 can be configured in many different stationary configurations and positions, and can include a direct heating module, optionally combined with other operational modules. In such embodiments (see, for example, FIG. 15), the stationary heat injector module 117 injects the desire BTU energy into the enclosed environment using a dedicated combustion blower 16. The dedicated combustion blower 16 allows a variable airflow with low static and low combustion emissions. The heat injector module 117 can be positioned in either a negative or positive injection chamber 51. The dedicated combustion blower 16 is sized to achieve the desired combustion air pressure.

In a configuration where the injection chamber 51 has a positive pressure, additional pressure can be added from the combustion blower 16 to offset the positive pressure to achieve the required combustion airflow. If the airflow is fresh air, the air inlet for the combustion blower can draw air from the pressurized injection chamber 51 upstream from the super heated airflow to achieve the desired combustion airflow without additional pressure. For systems that have larger burner 7 sizes, the combustion air blower 16 can also be variable speed to optimize the energy usage and to vary the combustion air pressure based upon the duct pressure.

In use, the system 77 can be positioned in a vertical position or a horizontal position. The system 77 can use an existing opening as an air intake 54 with an internal vestibule 101 used as a walkway. In this embodiment, the heat injector system 77 pulls fresh air 54 through the door frame 27. The system 77 can be moved to a new location in the vestibule 101 or left open with a temporary door in the vestibule 101 for personnel entrance. This feature of the system 77 allows it to function in many different operational modes. In a particular embodiment, with the system 77 positioned in the doorway 27 and the purge intake hood 69 configured to pull air from outside the environment 74, the environment 74 is purged with fresh air 54—with or without heat being injected.

When the system 77 is configured with the re-circulate air intake hood 71, such system 77 is configured to pull air from within the environment 74. That is, the environment 74 is heated to elevated, lethal temperatures for pests, mold, bacteria, and viruses. In this same position, the system 77 can engage the modulated air inlet 59 to pressurize the environment 74, forcing heat through all the small cracks and crevices within the environment 74.

In situations where the enclosed environment 74 is water damaged, the volume of air used to pressurize the environment 74 can be increased, with the engagement of the modulated air inlet damper 60 to exhaust warm moist air from the environment 74 through openings in the environment 66.

In other embodiments where the air is re-circulated, additional modules can be added to the modulated air inlet 59 to dehumidify the re-circulated air and/or to sanitize the air with airborne free radicals while the humidification tube 50 is employed in the injection chamber 51.

With these additional modules and the distribution system 26, the dehumidification process and the sanitization process can optionally also include the remote hydroxyl generator and the humidification tube, allowing them all to operate simultaneously during the heating process with the power of a single main airflow blower 58. These capabilities are also possible in moveable and stationary applications when the modules are positioned to achieve the same system 77.

By way of non-limiting example, the system 77 can be positioned in a doorway 27 with the air intake hood 71, configured to re-circulate the air, similar to the process used to heat the environment 74 to elevated temperatures. The discharge 21 utilizes the distribution system 26 to move the heated discharge air to remote locations 100 within the environment 74, farthest from the air intake 98 with the most significant moisture. As the temperature of the air in the heated environment 47 is elevated, the moisture within the environment 74 is more readily evaporated into the air. The temperature and evaporation will continue until the relative humidity of the air entering the intake contains enough moisture to begin the dehumidification process using the purging process.

Such purging process generally includes opening of the modulated air inlet gate 61 to draw fresh air through the modulated air inlet 59, thereby causing the discharged volume of air to become greater than the air intake 98 volume. This pressurizes the environment 74 to create an exhaust through openings 66 (such as doors and windows) in the environment 74 to purge moisture laden air from the environment 74. The volume of air used for this purge can be increased by the engagement of the modulated air inlet damper 60, and the volume of the purge is equal to the air volume passing through the modulated air inlet 59. The path for the purging airflow will be from the high pressure on the discharge 100 to the exhaust location 66. The path for the purging airflow can also be changed by relocation of the flexible duct 25 to different discharge locations 100 or opening different doors and windows as exhaust locations 66.

Figure 4C:
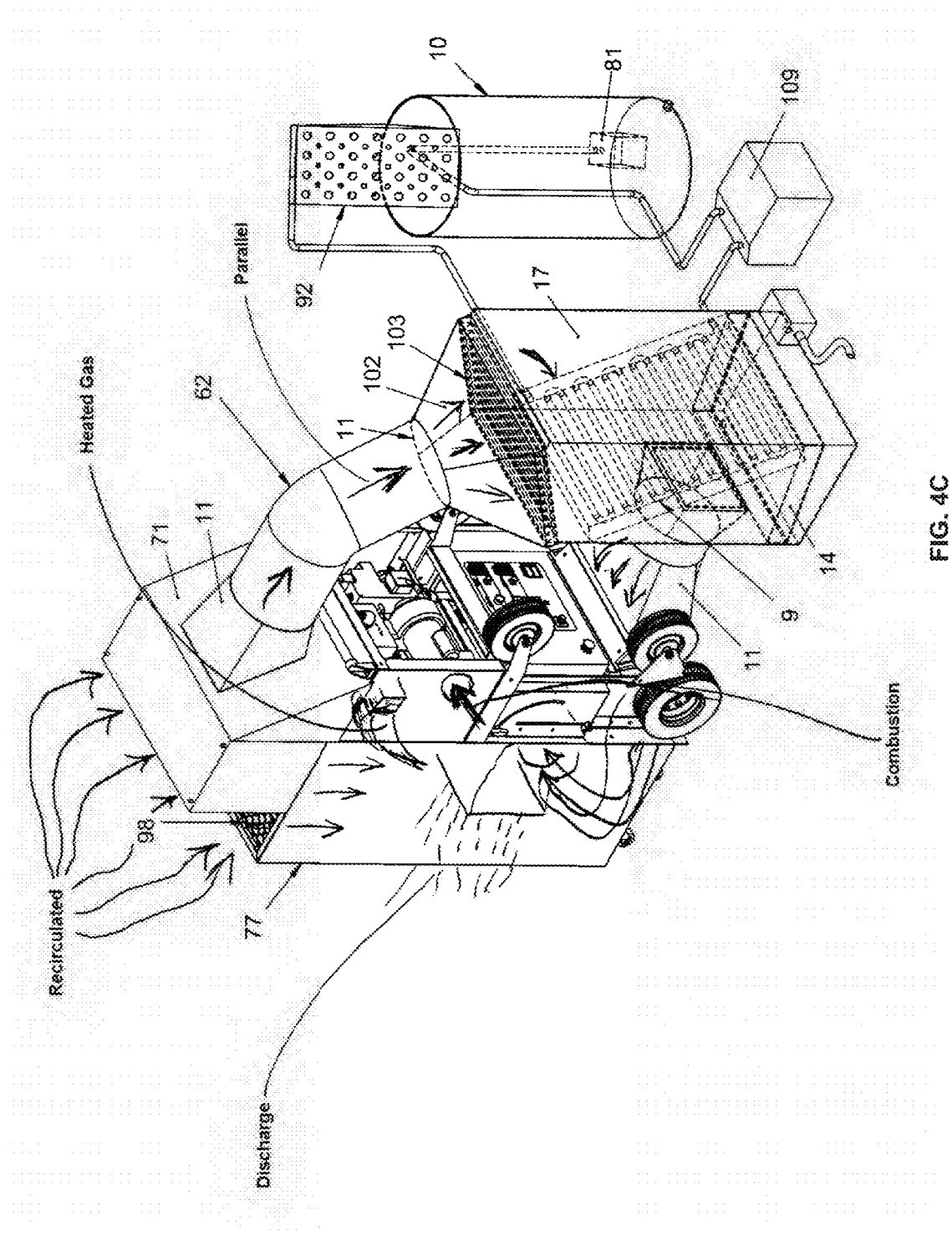
FIG. 4C is a schematic perspective view, partially in phantom, of a multi-component system for treating an enclosed environment, in a configuration for de-humidifying air in the environment. The path of airflow is illustrated with arrows and lines.
Figure 5E:
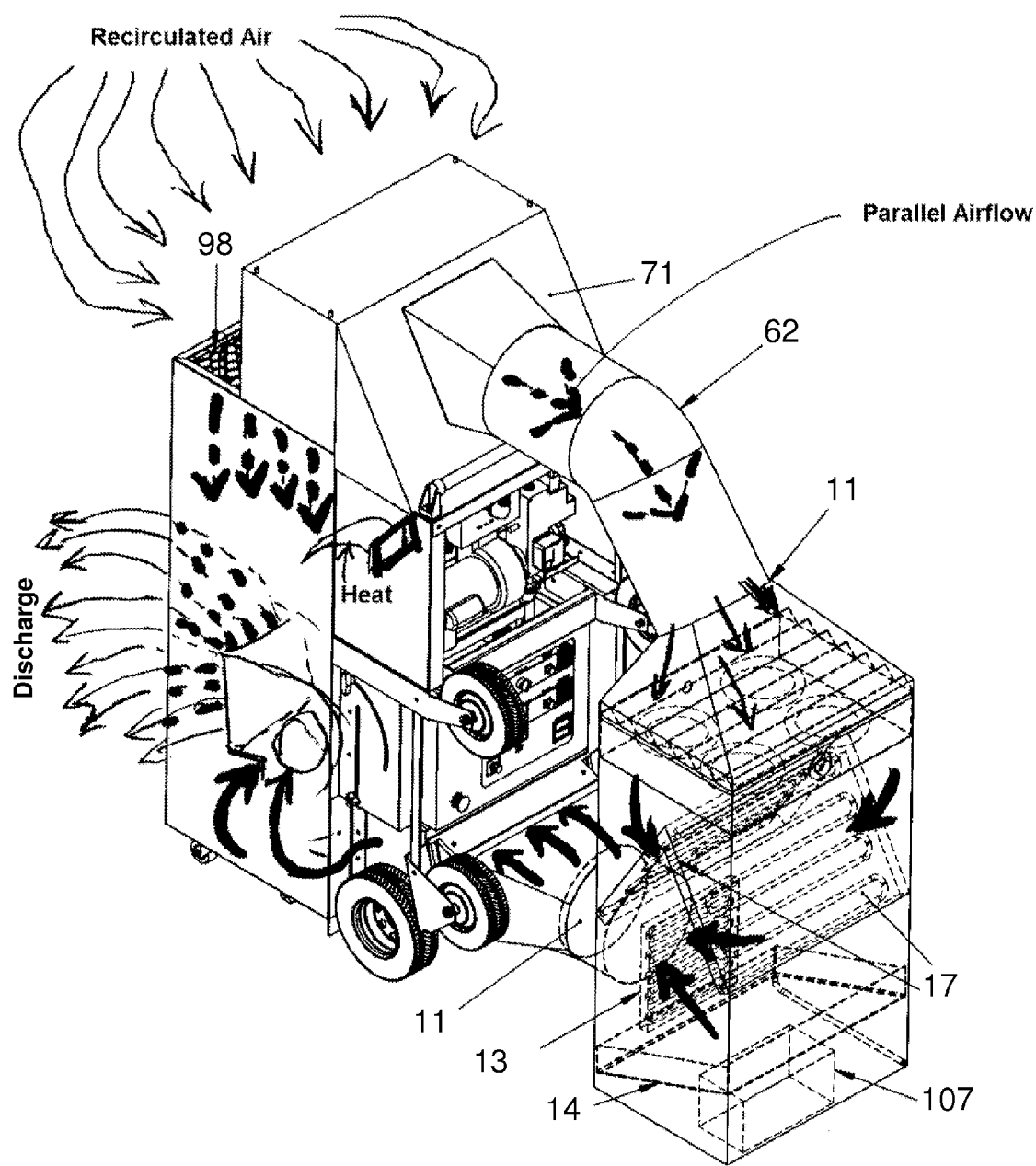
FIG. 5E is a schematic perspective view, partially in phantom, of a multi-component system for treating an enclosed environment, in a configuration for treating the air in the environment. The path of airflow is illustrated by arrows.

In certain embodiments, such as shown in FIG. 4A, a remote dehumidification chamber 17 can be used to dry the enclosed environment 74 when there is no opening to purge the moist air, or when the moisture content in the atmosphere outside the environment 74 is high. The remote dehumidification chamber 17 may be positioned outside the heated environment 74 with the portable heat injector positioned in the doorway 27, or positioned to act as the barrier to the environment. In such configurations, the air intake hood 71 can be positioned to draw air from within the environment 74, and the distribution system 26 can be attached to the discharge 21. By way of non-limiting example, the connections to the remote dehumidification chamber 17 can use flexible duct 25 and easy-to-connect cinches 11 or other secure connections made with rigid duct 62. The air inlet to the dehumidification chamber 17 can be attached to an opening, and can be closed with a solid fabric panel or plate 83, in the air intake hood 71. The cinched outlet 11 can be connected to the intake hood 71 to allow warm moist air to be drawn into the remote dehumidification chamber 17. When the relative humidity of the re-circulated airflow has a dew point which would allow the dehumidification process to be effective, the dehumidification process is engaged, drawing warm moist air from the environment 74 through a filter 103 before passing through a cooling coil 15 to remove moisture from the air. The chilled air may be reheated by a condensing coil 13 (e.g., present as a component of a refrigeration system), before being blended with the re-circulated airflow passing through the injection chamber 51. The airflow through the injection chamber 51 carries the required BTU energy to cause the blended air to be discharged at the operator chosen temperature.

The volume of air passing through the remote dehumidification chamber 17 can be adjusted with the modulated air inlet damper 60. The adjustment can be done manually or controlled automatically with input received from sensors on the dehumidification chamber 17 that sense temperature and moisture levels of the air entering and leaving the remote dehumidification chamber 17.

The system 77 is useful to dry an environment when positioned in a doorway 27 or with the use of the door sleeve 101, and such system can act as a barrier to the enclosed environment 74—with the air intake hood 71 positioned on top and configured to draw air from within the environment 74. The remote dehumidification chamber 17 is positioned outside the enclosed environment 74 and can draw air from within the enclosed environment 74 through an opening in the air inlet hood 71 when the air inlet hood 71 is connected to the modulated air inlet 59 of the system 77.

In certain embodiments, the remote dehumidification chamber 17 can include an air inlet 102 to draw warm moist air from the within the enclosed environment 74 through interconnecting ducts to the remote dehumidification chamber 17, through an air inlet filter 103, and through a cooling coil 13 to condense moisture from the warm recirculated air. In such configuration, the modulated air inlet gate 61 can be opened to engage the remote dehumidification chamber 17. The modulated air inlet damper 60 can be adjusted to control the volume of the air, and to optimize the dehumidification process, depending on the temperature of the air on the inlet, the dew point of the warm moist air, and the temperature of the air on the exit of the cooling coil 13.

The adjustments to the modulated air inlet gate 61 to achieve optimal dehumidification can be done manually or can be automated. The condensing coil 13, when present in a direct exchange cooling system 107, produces heat and can, therefore, be positioned inside the dehumidification chamber 17. In such configuration, the cooling coil 15 allows the heat to be passed into the chilled air before entering the modulated air inlet 59. The dehumidified air is blended with the heated airflow through the injection chamber 51, discharging heated and dehumidified air to absorb moisture from the enclosed environment 74. Also, the distribution system 26 can be attached to the discharge 21 of the system 77, discharging air to remote locations 100 within the environment thereby creating high pressure areas 104 to cause a recirculating airflow within the environment 74. This method benefits from the heat load of the environment and its contents, where the heated air absorbs moisture and looses BTU energy as it passes through the environment toward the air intake, increasing the dew point and the efficiency of the dehumidification process.

By way of a non-limiting example, the cooling coil 15 can be the evaporation coil 15 of a direct exchange refrigeration system 107 or a chilled water coil 9, chilled indirectly from a refrigerated water chiller 109, or chilled water from a remote environmentally chilled water reservoir 10. In such configuration, the water can be pumped from the bottom of the reservoir 10, where it is the coldest, with a water pump 81. The water is returned to the reservoir 10 through a cooling rack 92, environmentally chilling the water before entering the reservoir 10. Further, in certain embodiments, the water used in the chilled water coils can contain additives to keep from freezing and to prevent corroding the coils. This method improves the energy efficiency, allows dehumidification with low levels of electrical power and enables dehumidification in cold climates when refrigeration systems are inefficient or inoperable.

The system 77 with the remote dehumidification chamber 17 can also be positioned within the enclosed environment 74 if fresh air from outside the environment 74 is ported to the combustion air inlet 89, and the temperature within the environment is below the maximum operating temperature for the motor 63 and controls 33. In this position, both the air intake 98 and the remote dehumidification chamber 17 will draw air from within the environment; no intake hood 71 or air inlet to the remote dehumidification chamber 102 is required. With the employment of the distribution system 26, recirculated airflow within the enclosed environment 74 is established—from the high pressure area 104 at the remote discharge 100 toward the location of the air intake 98 and the air inlet 102 of portable dehumidification chamber 17.

In certain embodiments, the remote chilled water reservoir 10 contains a water pump 81 to pull the coldest water off the bottom and push it through the chilled water coil 9 in the remote dehumidification chamber 17. The heated, moist airflow that passes through the cooling coil 15 adds heat to the water being returned to the remote chilled water reservoir 10. This warmed water keeps the fluid in the remote chilled water reservoir 10 above the freezing point; additives within the water would reduce the freezing point. If the outside environment is not cold enough to cool the water while in the reservoir, a cooling rack 92 can be added before the water is returned to the remote reservoir 10. The cooling rack 92 allows significant heat from the water to be dissipated into the cold environment before entering the remote water reservoir 10. The airflow through the cooling coil 15 is adjustable to make optimal use of the cooling capabilities of the environment.

The condensed water from the cooling coil 15 is captured in a condensing pan 14 where several methods can be used to dispel the water. A hose can be attached directly to the condensing pan 14 to allow the water to flow to a drain or to a location outside the environment 74. Alternatively, a removable reservoir can be used where the water can be manually carried from the environment 74, or a reservoir attached to the condensing pan 14 with a pump and level sensing switch moves the water to an appropriate drain through a hose.

The airflow entering the dehumidification chamber 17 may be further conditioned with the hydroxyl generator 34; using ultraviolet light to produce airborne free radical hydroxyls in the airflow where organic particles in the air are decomposed into harmless carbon dioxide and water through chemical action. The airborne free radical hydroxyls are useful to remove smoke, volatile organic carbons (VOC), and have a positive effect upon the eradication of molds, viruses, and disease germs. Hydroxyls oxidize and break down even dangerous substances, and render them harmless. A wide variety of organic and explosive contaminants are susceptible to destruction by UV/oxidation. These contaminants include, but are not limited to: petroleum hydrocarbons; chlorinated hydrocarbons used as industrial solvents and cleaners; and ordnance compounds such as TNT, RDX, and HMX. In many cases, chlorinated hydrocarbons that are resistant to biodegradation may be effectively treated by UV/oxidation. Typically, easily oxidized organic compounds, such as those with double bonds (e.g., TCE, PCE, and vinyl chloride), as well as simple aromatic compounds (e.g., toluene, benzene, xylene, and phenol), are rapidly destroyed in UV/oxidation processes.

The hydroxyl generator 34 can operate with or without the remote dehumidification chamber 17, and can be placed parallel to the heated airflow to inject airborne free radical hydroxyls into the discharged air. This method of injecting both heat and hydroxyls with a single blower 58 while engaging the remote dehumidification chamber 17 (to thoroughly sanitize the environment 74 being treated for smoke and water damage), is not only energy efficient, but is also very effective.

The system 77 can also be equipped with a humidification tube 50 to add humidity or liquids to medicate the air or to add scents to the air along with the injection of hydroxyls 34 during the process of heating an environment 74 to elevated temperatures. The method of blending hydroxyls with heated air along with the employment of the humidification tube 50 is made possible by the modulated air inlet 59 that creates an airflow path parallel to the injection chamber 51. The system 77 can also be used in many processes/environments that have contaminates in the air and require temperature and humidity control.

The system 77 and the hydroxyl generator 34 (either placed on the modulated air inlet 59 or within the distribution system 26) can be used to sanitize the air being processed with both heat and hydroxyls. The hydroxyl ions are extremely short-lived molecules, generally existing for no longer than a second or so before becoming involved in an air-cleansing chemical reaction. The airborne free radical hydroxyls can be created by any one of several known methods. By way of a non-limiting example, a UVA-C light 129 or a negative ion generator 131 can be positioned within the hydroxyl generator module 34. The position of the UVA light 129 in proximity to the special coated surfaces that might include, but are not limited to, the cooling coil 15, the filter rack 103, and/or special coated grids 130 designed to produce hydroxyls. The UVA-C light 129 can be positioned before and/or after the air passes through the cooing coil 15. Additional hydroxyls might be generated with a negative ion generator 131 and special coated grids 130 located under the control panel 33 in the modulated air inlet cavity—to increase the production of hydroxyls or to produce hydroxyls without the use of the remote hydroxyl generator module 34. The hydroxyl generator module 34 being positioned in a path parallel to the injection of heat prevents the heated airflow from having a deleterious effect upon the generation of hydroxyls, and immediately blends the hydroxyls with the recirculated airflow. This allows the system to decontaminate the recirculated air, as may be required for processes releasing VOC into the air.

In the stationary embodiment of the heat injector 117 with the blower module containing the modulated air inlet, the modulated air inlet can draw air from within the heated environment 47 or fresh air from outside the heated environment. The fresh air passes through the hydroxyl generator 34, when attached to the modulated air inlet to pressurize heated environment 47 or to off-set an exhaust drawn from the heated environment 47. This configuration injects hydroxyls into the recirculated air to decontaminate the recirculated air and to prevent the contaminated air from having an effect upon the discharged air with the generation of hydroxyls. While it may be difficult to measure hydroxyls, their effect can be monitored, so the sensed concentration of VOC's in the recirculated air can be used to control the production of hydroxyls used to break down the VOC contaminates.

In still another configuration, with the system 77 positioned in the doorway 27, the air intake hood 71 can be positioned to draw air from within the environment 74. The remote dehumidification chamber 17 can be attached to the modulated air inlet 59. The air being drawn into the filtered air inlet 53 can be from outside the environment 74 to pressurize the environment 74 with heated, dehumidified air. And, in certain embodiments, the hydroxyl generator 34 can be built into the remote dehumidifier 17 to inject hydroxyls into the enclosed environment. By changing the position of the system 77 to outside the environment 74, the intake hood is not required. With the employment of the remote hydroxyl generator 34 and the humidification tube 50, this configuration may be used to supply heated air, or sanitized with hydroxyls and medicated vapors. In such configuration, the output potential of the humidification tube 50 is a function of the BTU output going into the airflow. The hydroxyl injection rate is a function of the airflow through the modulated air inlet 59 along with the power applied to the generation of airborne free radical hydroxyls 34.

In another configuration, the stationary heat injector module 117 can act as the heating apparatus, and can be operatively connected to rigid ductwork 62 to draw airflow from either inside the enclosed environment to be heated, or from outside the enclosed environment with the use of an inlet damper if the transition must be made periodically. With the power of a single main airflow blower 58 module (containing the modulated air inlet gate 61 and modulated air inlet damper 60), airflow is drawn both into the injection chamber 51 and (in a path parallel to the injection chamber) through the modulated air inlet. With the use of rigid duct 62, the dehumidification chamber 17 attaches the modulated air inlet 59 with the hydroxyl generator positioned on the inlet to the dehumidification chamber. The airflow through each path is variable, the single blower motor 63 having variable speed control 3 and the modulated air inlet volume being controlled with the adjustment of the modulated air inlet damper 60. The hydroxyl generator 34 can be employed to inject airborne free radical hydroxyls into the airflow passing through the cooling coil 15 of the dehumidification chamber 17. The humidification tube 50 is employed in the injection chamber 51 to further condition the air with humidity during the heating seasons when significant levels of BTU energy make the application of the humidification tube 50 practical. In this embodiment, the airflow passing through parallel paths is conditioned and/or blended in the common discharge 21. The modulated air inlet gate 61 is closed and the modulated air inlet damper 60 is disengaged when the dehumidification chamber 17 is not employed.

The operational controls for the heat injector 117 and system 77 can be designed to be simple and safe. The burner 7 can be started with a closed set of contacts from a switch or a thermostat 19 within the area to be heated, interlocked with all the required combustion interlocks and the main airflow blower 58 to confirm airflow through the injection chamber 51. The burner 7 can be lighted with direct spark ignition 20, controlled by the flame management system 36 that also continuously monitors the airflow. The gas modulation valve 46 is controlled by a temperature controller 76 sensing the discharge temperature 22. Human intervention is not required during the elevated heating process for the efficient operation of the system 77. The air intake 98 temperature is a measurement of the BTU energy not being absorbed by the environment and its contents; therefore, the recirculated air temperature is a status indication for the elevated temperature process. As the level of heat within the environment 74 increases, the temperature of the re-circulated air will slowly increase, causing the difference between the discharge 21 and the returned air temperature to become less until the continued re-circulation causes the actual internal temperatures throughout the environment 74 to approach the discharge temperature. At this time the environment 74 can be entered to take surface and air temperature measurements, along with measurements for carbon monoxide and other air contaminates. The flexible discharge duct 25 can then repositioned, and/or the discharge airflow can be altered, to ensure a thorough heat treatment.

In certain embodiments, when the system 77 is positioned as a barrier to the heated environment 74 with the discharge 21, at a regulated discharge temperature, attached to the distribution system 26 to move heated air to remote locations 100 within the environment 74. The system 77 allows unattended operation during the elevated heating process. In this operation mode, the system 77 cannot overheat an area because the temperature within the environment 74 is never greater than the regulated discharge temperature. If the environment 74 being heated is small and does not have a second entrance, the elevated heat process could be completed without entering the environment 74 with the use of remote temperature sensors 93, due to the recirculated airflow within the heated environment 47 created by the distribution system. The operator can project the time remaining on the gas supply based upon volume measurements and projected usage considering the airflow and temperature rise, thereby allowing extended periods of time without on-site operator intervention. The air intake temperature can also be used as input to engage the burner, to act as a thermostat.

The system 77 also allows the environment 74 to be purged with fresh air, by the repositioning of the air intake hood 71, to draw fresh air from outside the heated environment to purge heat from the environment after the elevated temperature process is completed. If the air inlet shell 2 is used as a barrier to the heated environment 74, the airflow through the modulated air inlet 59 can be used to purge the environment 74.

The operational performance of the system 77 can be configured to communicate to the operator outside the environment 74 with remote sensors positioned within the heated environment 47, and remote monitors with interconnecting wires attached from within the environment 74 into sockets 94 on the system 77, accessible to the heated environment 74 and made available to the main control panel 33 through interconnected conduit. The remote sensors 93 are displayed at the main control panel 33 with the use of a multiple position switch or other means to display the actual for each sensor 93. The monitors can be data logged to create a time-based process chart, recording the location within the heated environment 47 and the sensed condition, which might include the discharge temperature, the relative humidity, the moisture content of the wood, grains of moisture in the air, the dew point, the VOC contaminate level, ozone level, carbon monoxide level, and the air intake temperature. This information can be used to adjust the discharge temperature, the main airflow blower, or the airflow through the modulated air inlet, and to determine if the environment 74 needs to be visited, to reposition discharge points, or to shift the discharge balance with the addition of velocity cones 80 or changes in the size of duct. The sensed information can be communicated via wireless communication to remote locations. The real-time information received from these sensors 93, visible to the operator from outside the environment 74, reveal the status of the elevated heat or dehumidification process. Other data such as GPS location, date, and time can also be recorded to validate the remediation process.

This method of dehumidifying an environment 74 with a remote dehumidification chamber 17 (where the ducted dehumidifier chamber, without an internal fan, is attached to the modulated air inlet 59 of the system 77, and where the volume of air through the dehumidifier is adjusted with the modulated air inlet damper 60 to optimize the dehumidification with the airflow through the injection chamber) transfers enough heat to cause the blended air temperature to be at the operator-chosen discharge temperature. The BTU energy injected to aid in the evaporation rate for the dehumidification process can be used as the basis to further heat the environment 74 to elevated temperatures to kill pests, mold, bacteria, and viruses.

In certain embodiments, the versatility of the system 77 can be increased with the use of a gas engine 119 to operate the system 77 at full power without access to land line electricity or a generator. The gas engine 119 enables energy efficient heated air, with low emissions to operate at full power in the event of catastrophic events where power outages occur during cold seasons. In addition, with the employment of the remote dehumidification chamber with environmentally chilled water supply, this system can be used to dry an environment during the time of a power outage, a method to save lives and property.

As shown in the embodiment in FIGS. 7A-7C, the gas engine 119 can have a belt or chain to power the drive shaft 123 installed in place of the electric motor 63. The speed of the gas engine is different that the speed of the motor so the pitch diameters of the pulleys on the drive shaft compensate to ensure the speed to the gas engine at full power is within its maximum allowable speed for the blower. The horsepower available from the gas engine can be significantly greater than the power available from a normal house circuit, thereby allowing more air to be moved through the injection chamber. The horsepower curve for the blower can be used to size the engine and the pulley relationships.

This embodiment of supplying energy efficient portable heat during times of power outages thus eliminates the inefficiency of generating electricity and subsequently converting electricity to mechanical force in order to drive the main airflow blower. In such configurations, the gas engine 119 can drive the main airflow blower 58 of the system 77. This gas engine 119 provides greater power than may be available from the land-based power. In such configurations, the gas engine 119 can increases the air volume with less energy due to the low static load, which allows the volume of air to change without changing the air-to-fuel ratio due to the dedicated combustion blower used to inject the BTU energy. If the power outage occurred during a cold season, this embodiment could also include the application of the environmentally chilled dehumidification chamber 17 to supply heated and dehumidified air.

In such configuration, the main airflow blower 58 is engaged with the engagement pulley 122 after the gas engine 119 is started. The gas engine 119 is throttled to vary the speed of the blower 58 without affecting the clean-burning characteristics of the direct gas-fired burner 7 with dedicated combustion blower 16. The gas engine 119 may be powered with natural gas, propane, or gasoline. Fresh air from a location clear of the exhaust fumes is ported to the combustion air inlet 89 and the diverted modulated air inlet 108 when the gas engine power module is used. The battery 128 used to start the gas engine 116 can also power an inverter 121 to produce the 120 vac power for the combustion blower 16 and the controls 33. The battery 128 can be charged with the output magneto or generator 114 typically used with such gas engine 119.

The application of the gas engine 119 to the system 77 allows variable volumes of energy efficient heated airflow, at regulated temperatures, to be produced without land-based power 32 or a portable generator. This configuration also provides a very energy-efficient method for producing heated airflow during power outages, eliminating the inefficiency of generating the electricity and the inefficiency of the motor converting the electrical power to the mechanical force required to operate the blower. This configuration can include the application of the remote dehumidification chamber 17 (optionally having the environmentally chilled cooling coil 9) to allow an environment 74, during cold weather, to be heated and dehumidified during a power outage. The 12 vdc power required to operate the small water pump 81 at the bottom of the chilled water reservoir is drawn from the battery 128 of the gas engine power module or can be supplied as 120 vac power from the inverter powered by the battery 128.

Figure 17:
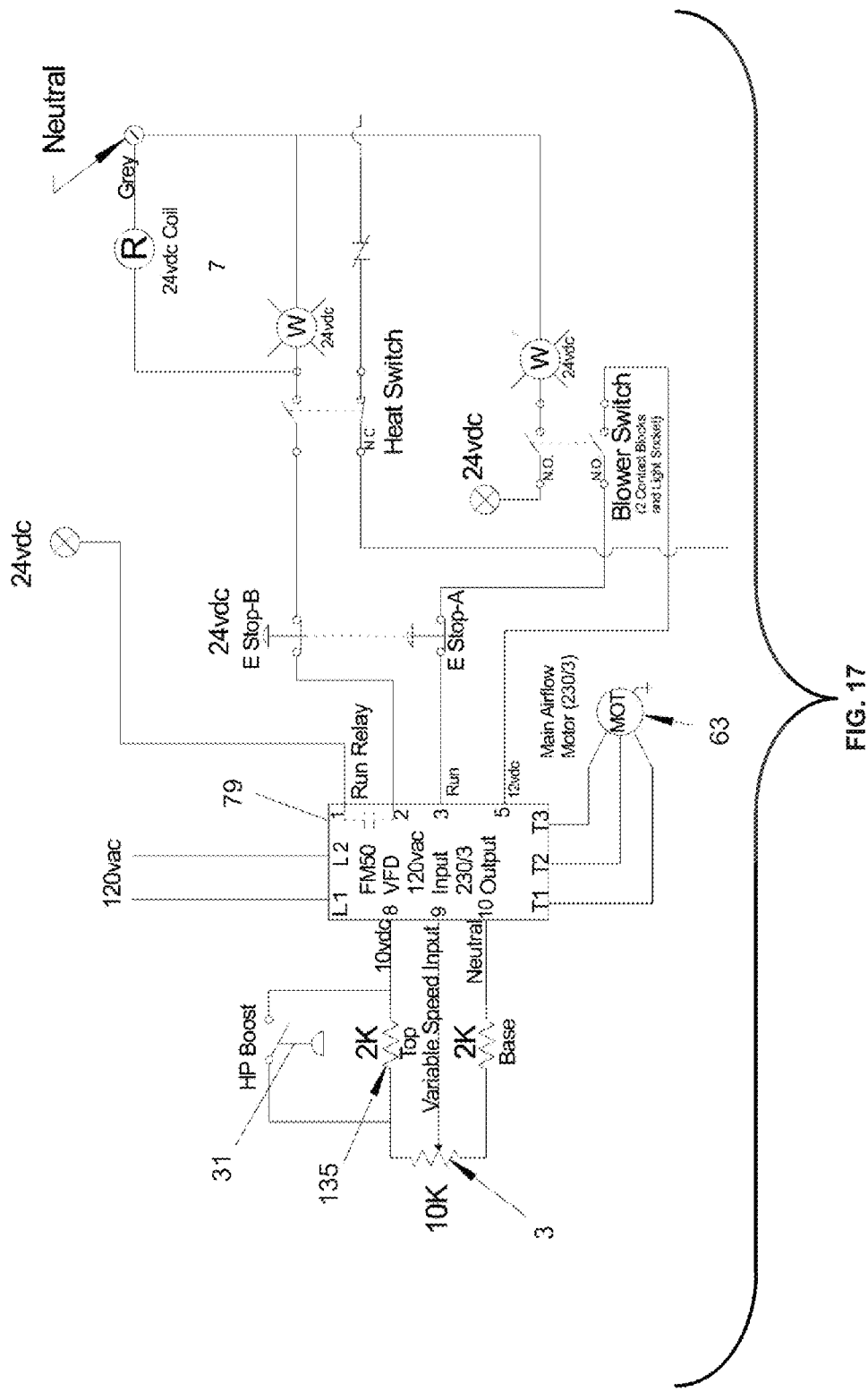
FIG. 17 is an electrical schematic illustration, showing where the speed of a motor automatically increases when a static load reaches a defined pressure and decreases when the static load is removed.

Referring now to FIG. 17, the details of the logic for one embodiment of a HP boost circuit is schematically illustrated. The highest voltage on the wiper of the 10K variable resistor, with circuit as shown, where the total resistance is 14K on the 10 vdc speed adjustment circuit. The current in the circuit is: 10 vdc/14,000 ohms=0.714 micro amps. The highest voltage from the wiper of the variable resistor is: 8.572 vdc. This is determined by the voltage drop across the top 2K resistor: 2000×0.000714=1.428 vdc. The highest adjustment is the source of 10 v less the voltage drop of 1.428=8.572.

In the operational system, the top resistor is sized; based upon the current draw with an unducted discharge, to establish a maximum motor speed from the front panel adjustment. The pressure switch on the discharge is adjusted to close the contacts that shunt the top resistor when the static load causes the motor current to fall off significantly. The maximum speed parameter in the VFD is set to the draw maximum current at the static load that dosed the shunting contacts. The minimum speed adjustment is established by sizing the base resistor; the motor speed would be from the lowest voltage from the wiper of the speed adjustment. The minimum speed would be a function of the sensor used to confirm airflow to engage the burner. In the example in FIG. 17, that is 1.428 vdc. The top and bottom resistors will vary based upon the pulley ratios which determine the required motor speed. The VFD is set to have a minimum of 10K resistance in the speed adjustment circuit so a 10K speed adjustment allows top resistor to be shunted without overloading.

FIG. 18 schematically illustrates a general method for heat treatment using one of the systems described herein. Such method can include the steps of:
  positioning the system to create a thermal seal;
  attaching a discharge duct
  supplying energy to the system, e.g., plugging in the system into an electrical outlet;
  testing ducts for full airflow;
  attaching gas canisters to a manifold;
  attaching supply hose to a manifold;
  attaching supply hose to the system;
  charging lines to the system;
  shutting off to confirm pressure after desired time interval has passed;
  opening valve at system;
  starting airflow;
  starting heat at specified temperature;
  monitoring enclosed environment areas being treated;
  balancing flow rates;
  pressurizing when return air is lethal; and
  purging heat after treatment.

Figure 19:
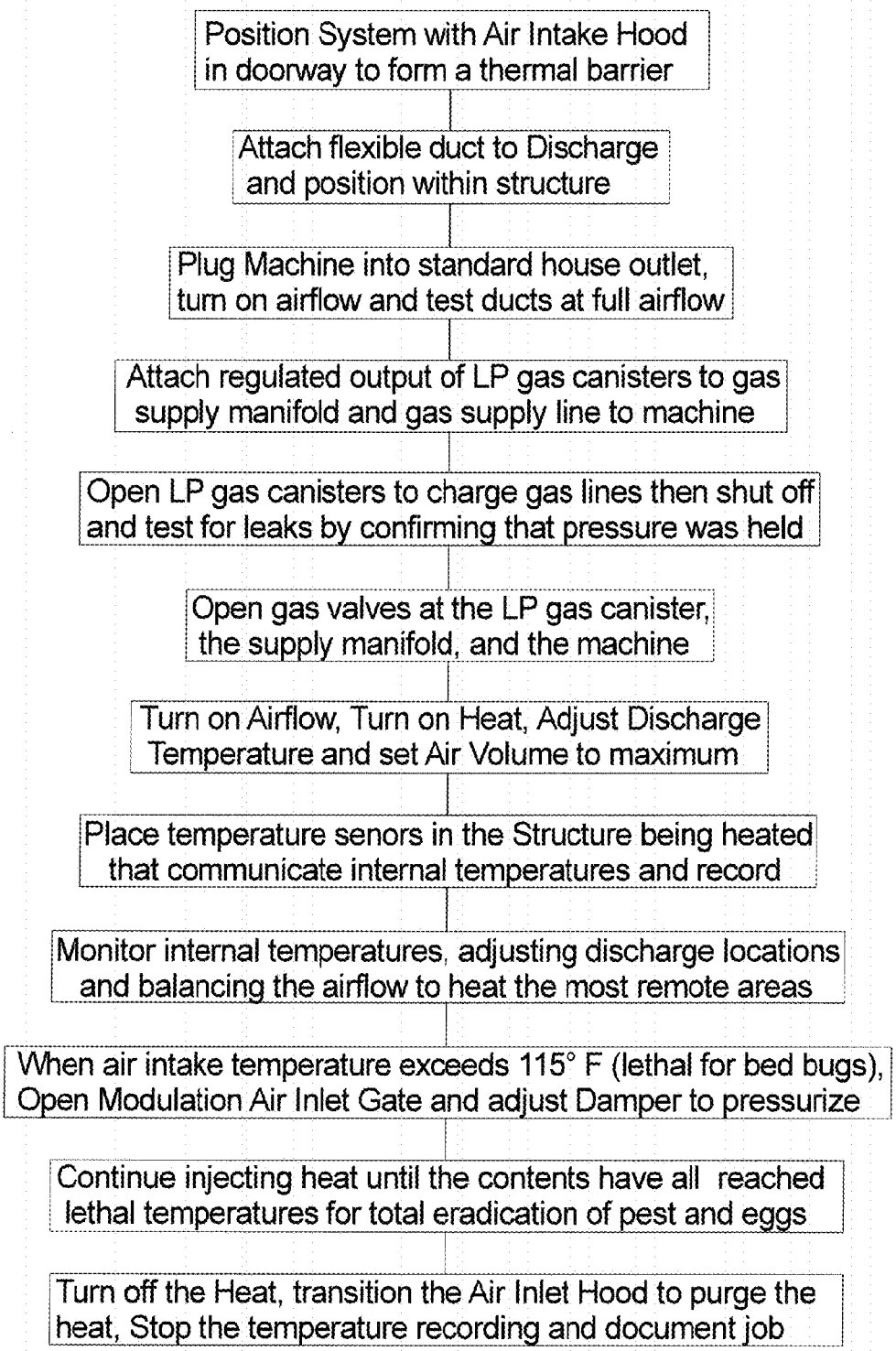
FIG. 19 is a flow chart depicting the steps of a non-limiting method for eradicating bed bugs from an enclosed environment dwelling using a multi-component system.

FIG. 19 schematically illustrates a general method for eradicating bed bugs using one of the systems described herein. Such method can include the steps of:
  positioning the system with the air intake hood in opening (e.g., doorway) of the enclosed environment to form a thermal barrier;
  attaching flexible duct to discharge and position within enclosed environment (e.g., structure);

supplying energy to the system, e.g., plugging system into standard house outlet;

turning on airflow;

testing ducts at full airflow;

attaching regulated output of LP gas canisters to gas supply manifold and gas supply line to system;

opening LP gas canisters to charge gas lines, then shutting off and testing for leaks by confirming that pressure was held opening gas valves at the LP gas canister, the supply manifold, and the system;

turning on airflow;

turning on heat;

adjusting discharge temperature, setting air volume (e.g., setting to maximum);

placing temperature sensors in the enclosed environment being heated where the sensors communicate internal temperatures, and record temperatures;

monitoring internal temperatures, adjusting discharge locations and balancing the airflow to heat the most remote areas when air intake temperature exceeds 115° F. (lethal for bed bugs), opening modulation air inlet gate and adjusting damper to pressurize;

continue injecting heat until the contents have all reached lethal temperatures for total eradication of pest and eggs;

turning off the heat, transitioning the air inlet hood to purge the heat;

stopping the temperature recording, and documenting completion of eradication.

FIG. 20 schematically illustrates a general method for eradicating smoke and/or water using one of the systems described herein. Such method can include the steps of:

positioning the system such that the air intake hood draws air from the enclosed environment, and forms a thermal barrier between the enclosed environment and an external environment;

attaching flexible duct to the discharge, and positioning discharge locations within the enclosed environment;

supplying energy to the system, e.g., plugging system into standard 120 v source;

turning on airflow and testing ducts at full airflow;

attaching regulated output of LP gas canisters to gas supply manifold and gas supply line to system;

opening LP gas canisters to charge gas lines, then shutting off and testing for leaks by confirming that pressure was held;

opening gas valves at the LP gas canister, the supply manifold, and the system;

turning on Airflow, and set Air Volume;

turning on heat and adjusting Discharge Temperature;

recirculating the heated airflow within the enclosed environment to achieve desired relative humidity (RH) at intake;

attaching a remote dehumidification chamber to modulated air inlet, and positioning to draw warm moist air from enclosed environment;

once desired RH is reached, opening modulated air inlet gate, and adjusting damper to achieve optimal dehumidification;

optionally, engaging the hydroxyl generator chamber to inject hydroxyls within the dehumidification chamber into Blended Air Discharge;

monitoring internal temperatures and moisture content in air and enclosed environment until acceptable ranges are met;

stopping the heat and dehumidification of the enclosed environment.

It will be appreciated that various modification and changes may be made from the above described embodiments of a heat injector system 77 with associated remote operational modules without departing from the scope of the following claims.

What is claimed is:

1. An apparatus to supply an adjustable volume of heated discharge air, comprising:
    a source of BTU energy having a dedicated combustion blower, the dedicated combustion blower being configured to establish an air-to-fuel ratio of a direct gas-fired burner and to supply heated air;
    an injection chamber operatively connected to the source of BTU energy to receive the heated air from the source of BTU energy;
    a dual inlet blower operatively connected to the injection chamber, wherein an adjustable volume of air is drawn through an air intake connected to the injection chamber by the dual inlet blower to form a heated discharge air; and,
    a modulated air inlet gate, and a modulated air inlet damper in communication with the modulated air inlet gate and the dual inlet blower, the modulated air inlet damper being movable to one or more positions,
    the modulated air inlet damper being configured to provide a variable and divergent airflow through the modulated air inlet gate, the variable and divergent airflow being blended with the heated air received in the injection chamber to form a the heated discharge air.

2. The apparatus of claim 1, further comprising a dehumidification chamber positioned in communication with the modulated air inlet gate and the modulated air inlet damper, the dehumidification chamber comprising a cooling mechanism configured to condense moisture from air being drawn into the apparatus before entering the modulated air inlet gate.

3. The apparatus of claim 2, further comprising a free radical ion generator within the dehumidification chamber, the free radical ion generator being configured to inject hydroxyls into airflow through the modulated air inlet.

4. The apparatus of claim 1, further comprising a humidification tube positioned within the injection chamber, the humidification tube having one or more openings and being configured for receiving a fluid.

5. The apparatus of claim 1, further comprising an air intake hood in communication with the injection chamber and positioned to form a barrier between an enclosed environment and an external environment,
    the air intake hood being configured to draw air from the enclosed environment into the dual inlet blower when in a closed position and from the external environment into the dual inlet blower when in an open position.

6. The apparatus of claim 5, wherein, when the air intake hood is in an open position, further including a distribution system operatively attached to the injection chamber and configured to deliver a discharge of blended air to the enclosed environment, wherein the discharge of blended air transfers the BTU energy into the enclosed environment and forces a blended airflow from an opening in the enclosed environment.

7. The apparatus of claim 5, wherein the distribution system is operatively attached to the injection chamber, and the apparatus further includes a humidification tube positioned within the injection chamber, and optionally, a hydroxyl generator configured within the distribution system to generate hydroxyls from the moisture produced by the humidification tube.

8. The apparatus of claim 2, wherein the apparatus is configured to be removably positioned within an enclosed environment, whereby airflow from the enclosed environment is into both the dehumidification chamber and the air inlet; and wherein the dedicated combustion blower is configured to draw fresh air from outside the enclosed environment.

9. The apparatus of claim 5, wherein the air intake hood is positioned to draw air from the enclosed environment and to form a barrier between the enclosed environment and the external environment;

wherein the BTU energy is transferred into the enclosed environment through ductwork attached to the apparatus thereby transferring BTU to one or more discharge locations within the enclosed environment, and recirculating airflow within the enclosed environment.

10. The apparatus of claim 9, further comprising a temperature sensor at the air inlet to determine when the BTU energy discharged within the enclosed environment is consumed by the enclosed environment.

11. The apparatus of claim 9, wherein the modulated air inlet gate and the modulated air inlet damper are configured to transition a percentage of the air intake to be drawn through the modulated air inlet, wherein the airflow through the modulated air inlet pressurizes the enclosed environment.

12. The apparatus of claim 9, wherein the modulated air inlet gate is configured to be opened and the modulated air inlet damper is configured to be engaged when the air intake temperature reaches a desired temperature.

13. The apparatus of claim 9, wherein the modulated air inlet gate is configured to be opened and the air inlet damper is configured to be engaged when the heated blended air flow entering the air intake becomes moisture laden to purge moisture laden air from the enclosed environment.

14. A method of dehumidifying an enclosed environment comprising:

positioning the apparatus of claim 3 to form a barrier between an enclosed environment and an external environment;

condensing moisture from the airflow drawn from the enclosed environment through the modulated air inlet to dehumidify the enclosed environment; and, optionally, injecting airborne free radicals into the heated air.

15. A method to remediate pests from an enclosed environment, the method comprising:

positioning the apparatus of claim 5 so that the air intake hood is positioned in an opening of the enclosed environment to form a barrier between the enclosed environment and an the external environment and positioned to draw airflow from the enclosed environment;

delivering heated air to the enclosed environment through duct attached to the discharge apparatus, thereby transferring the BTU energy to the enclosed environment;

injecting the discharge air for a time sufficient for eradication of the pests;

opening the modulation air inlet gate and adjusting the modulated air inlet damper to pressurize the enclosed environment; thereby forcing heated air from within the enclosed environment through any cracks or crevices present in the enclosed environment;

and, transitioning the air inlet hood to purge the heated air from the enclosed environment.

16. A method to remediate smoke or water damage in an enclosed environment, the method comprising:

positioning the apparatus of claim 5 to form a barrier between the enclosed environment and the external environment;

delivering heated air to the enclosed environment through duct attached to the apparatus, thereby transferring the BTU energy to the enclosed environment, wherein the apparatus includes a dehumidification chamber positioned in communication with the modulated air inlet gate and the modulated air inlet damper, the dehumidification chamber comprising a hydroxyl generator located prior to the cooling mechanism configured to condense moisture from air being drawn into the apparatus before entering the modulated air inlet gate;

positioning the air intake hood to draw air from the external environment;

purging contaminated air from the enclosed environment;

repositioning the air intake hood to draw air from inside the enclosed environment;

injecting heated blended air into the enclosed environment, wherein the heated air is distributed within the enclosed environment;

engaging the dehumidification chamber by opening the modulated air inlet gate to draw air from the enclosed, heated environment when the moisture content is sufficient; and adjusting the airflow through the modulated air inlet gate with the modulated air inlet damper to achieve a desired amount of dehumidification of the airflow through the modulated air inlet; and, optionally, injecting airborne hydroxyls into the enclosed environment.

* * * * *